US011263283B1

(12) United States Patent
Westmoreland et al.

(10) Patent No.: US 11,263,283 B1
(45) Date of Patent: Mar. 1, 2022

(54) METHOD AND SYSTEM FOR ASYNCHRONOUS CORRELATION OF DATA ENTRIES IN SPATIALLY SEPARATED INSTANCES OF HETEROGENEOUS DATABASES

(71) Applicant: Proof of Concept, LLC, Austin, TX (US)

(72) Inventors: Andrew B. Westmoreland, Austin, TX (US); Timothy Hanus, Austin, TX (US)

(73) Assignee: Proof of Concept LLC, Austin, TX (US)

( * ) Notice: Subject to any disclaimer, the term of this patent is extended or adjusted under 35 U.S.C. 154(b) by 222 days.

(21) Appl. No.: 16/529,788

(22) Filed: Aug. 2, 2019

Related U.S. Application Data

(60) Provisional application No. 62/688,923, filed on Jun. 22, 2018.

(51) Int. Cl.
*G06F 15/16* (2006.01)
*G06F 16/957* (2019.01)
(Continued)

(52) U.S. Cl.
CPC ...... *G06F 16/9574* (2019.01); *G06F 16/9035* (2019.01); *G06F 16/9537* (2019.01);
(Continued)

(58) Field of Classification Search
CPC ... G06Q 30/242; G06F 16/23; G06F 21/6263; G06F 21/6245; H04L 63/0815; H04L 67/146; H04L 69/329
See application file for complete search history.

(56) References Cited

U.S. PATENT DOCUMENTS 7,181,438 B1 * 2/2007 Szabo ................ G06F 21/6245
7,546,370 B1 * 6/2009 Acharya ............... G06F 16/951
709/227

(Continued)

OTHER PUBLICATIONS

Westmoreland, Andrew B., et al., "Method and System for Asynchronous Correlation of Data Entries in Spatially Separated Instances of Heterogenous Databases" filed Sep. 7, 2017, U.S. Appl. No. 62/555,182.

(Continued)

*Primary Examiner* — Dustin Nguyen

(57) ABSTRACT

A computing system directs a transmission of a first data piece and a second data piece to an electronic device, when the electronic device is engaged in an initial web browser session on an initial web browser, for storage in an electronic device memory. The first data piece is associated with a first domain linked to the initial web browser and contains an electronic device identification. The second data piece is associated with a second domain linked to the initial web browser and contains the electronic device identification. The computing system retrieves the second data piece from the electronic device memory when the computing system is unable to retrieve the first data piece from the electronic device memory. The second data piece retrieved from the electronic device contains the electronic device identification and items of anonymous personal identification information provided by the electronic device during the initial web browser session.

18 Claims, 10 Drawing Sheets

(51) Int. Cl.
  *G06F 16/9537*   (2019.01)
  *G06F 16/9035*   (2019.01)
  *H04L 9/06*   (2006.01)
  *H04L 101/622*   (2022.01)
  *H04L 29/06*   (2006.01)
  *H04L 67/02*   (2022.01)

(52) U.S. Cl.
  CPC ........ *H04L 9/0643* (2013.01); *H04L 61/6022* (2013.01); *H04L 63/18* (2013.01); *H04L 63/20* (2013.01); *H04L 67/02* (2013.01)

(56) References Cited

U.S. PATENT DOCUMENTS

| | | | | |
|---|---|---|---|---|
| 9,344,505 | B1* | 5/2016 | Martin | H04L 67/146 |
| 2002/0099936 | A1* | 7/2002 | Kou | H04L 69/329 |
| | | | | 713/151 |
| 2009/0055908 | A1* | 2/2009 | Rapoport | H04L 63/0815 |
| | | | | 726/6 |
| 2010/0094704 | A1* | 4/2010 | Subramanian | G06Q 30/0242 |
| | | | | 705/14.45 |
| 2015/0046579 | A1* | 2/2015 | Perez | G06F 16/23 |
| | | | | 709/224 |
| 2018/0107752 | A1* | 4/2018 | Elez | G06F 21/6263 |

OTHER PUBLICATIONS

"Westmoreland, Andrew B., et al., ""Method and System for Asynchrononous Correlation of Data Entries in Spatial Instances of Heterogeneous Databases"" filed Jun. 1, 2018, U.S. Appl. No. 62/679,389.".

Westmoreland, Andrew B., et al., "Method and System for Data Collection and Aggregation in Heterogeneous Databases" filed Jun. 1, 2018, U.S. Appl. No. 62/679,427.

Westmoreland, Andrew B., et al., "Method and System for Asynchronous Correlation of Data Entries in Spatial Instances of Heterogeneous Databases" filed Jun. 22, 2018, U.S. Appl. No. 62/688,923.

Westmoreland, Andrew B., et al., "Method, Apparatus, and System for Receiving and Storing Non-Schema Data Entries in Spatial Instances of Heterogeneous Databases" filed Aug. 1, 2018, U.S. Appl. No. 62/713,446.

Westmoreland, Andrew B., et al., "Method, Apparatus, and System for Receiving and Weighting Non-Schema Data Entries in Spatial Instances of Heterogeneous Databases" filed Aug. 10, 2018, U.S. Appl. No. 62/717,219.

Westmoreland, Andrew B., et al., "Method and System for Determining Transfer of Asynchronous Correlation of Data Entries in Spacial Instances of Heterogenous Databases" filed Dec. 3, 2018, U.S. Appl. No. 62/774,692.

Westmoreland, Andrew B., et al., "Method and System for Asynchronous Correlation of Data Entries in Spatially Separated Instances of Heterogenous Databases," filed Sep. 7, 2018, U.S. Appl. No. 16/124,889.

Westmoreland, Andrew B., et al., "Method, Apparatus, and System for Receiving and Weighting Non-Schema Data Entries in Spatial Instances of Heterogeneous Databases," filed Aug. 9, 2019, U.S. Appl. No. 16/537,510.

Westmoreland, Andrew B., et al., "Method Apparatus and System for Receiving and Weighting Nonschema Data Entries in Spatial Instances of Heterogeneous Databases," filed Aug. 1, 2019, U.S. Appl. No. 16/529,783.

Westmoreland, Andrew B., et al., "Method and System for Asynchronous Correlation of Data Entries in Spatially Separated Instances of Heterogenous Databases," filed Dec. 3, 2019, U.S. Appl. No. 16/702,337.

Westmoreland, Andrew B., et al., "Method and System for Asynchronous Correlation of Data Entries in Spatially Separated Instances of Heterogenous Databases," filed Aug. 1, 2019, U.S. Appl. No. 16/529,755.

Westmoreland, Andrew B., et al., "Method and System for Asynchronous Correlation of Data Entries in Spatially Separated Instances of Heterogenous Databases," filed Aug. 1, 2019, U.S. Appl. No. 16/529,770.

* cited by examiner

METHOD AND SYSTEM FOR ASYNCHRONOUS CORRELATION OF DATA ENTRIES IN SPATIALLY SEPARATED INSTANCES OF HETEROGENEOUS DATABASES

TECHNICAL FIELD

The present disclosure relates to storing user data from web browsing sessions in a user profile and retrieving a specific subset of the stored user data.

BACKGROUND

Websites are capable of tracking users who visit and interact with the websites by storing a cookie on the user's web browser. The data stored by the cookie may be saved to a database associated with the website. The term "cookie" is generally used to refer to a piece of data sent from a website and stored by the web browser. The stored data may be data for known users (e.g. users that have registered with the website, for example by making an account) or the stored data may be data for anonymous users (e.g. users that have not registered with the website). It is often difficult to match the data for an anonymous user to a known user or a known identity across multiple websites or databases.

SUMMARY

This disclosure provides systems and methods for overcoming interruptions in network traffic to access personal identification information (PII) provided during a web browser session.

In a first embodiment, the disclosure provides an apparatus including a computing system that is communicatively linked to a server. The computing system includes a memory and at least one processor. The computing system is configured to direct a transmission of a first data piece to an electronic device, when the electronic device is engaged in an initial web browser session on an initial web browser, for storage in an electronic device memory. The first data piece is associated with a first domain that is linked to the initial web browser. The first data piece contains an electronic device identification. The computing system is also configured to direct a transmission of a second data piece to the electronic device, when the electronic device is engaged in the initial web browser session on the initial web browser, for storage in the electronic device memory. The second data piece is associated with a second domain that is linked to the initial web browser. The second data piece contains the electronic device identification. The computing system is further configured to retrieve the second data piece from the electronic device memory when the computing system is not able to retrieve the first data piece from the electronic device memory. The second data piece retrieved from the electronic device contains the electronic device identification and one or more items of anonymous personal identification information provided by the electronic device during the initial web browser session.

In a second embodiment, the disclosure provides a computer-implemented method performed by a computing system. The computer-implemented method includes directing, by the computing system, a transmission of a first data piece to an electronic device, when the electronic device is engaged in an initial web browser session on an initial web browser, for storage in an electronic device memory. The first data piece is associated with a first domain that is linked to the initial web browser. The first data piece contains an electronic device identification. The computer-implemented method also includes directing, by the computing system, a transmission of a second data piece to the electronic device, when the electronic device is engaged in the initial web browser session on the initial web browser, for storage in the electronic device memory. The second data piece is associated with a second domain that is linked to the initial web browser. The second data piece contains the electronic device identification. The computer-implemented method further includes retrieving, by the computing system, the second data piece from the electronic device memory when the computing system is not able to retrieve the first data piece from the electronic device memory. The second data piece retrieved from the electronic device contains the electronic device identification and one or more items of anonymous personal identification information provided by the electronic device during the initial web browser session.

In a third embodiment, the disclosure provides a non-transitory, computer-readable storage medium. The non-transitory, computer-readable storage medium stores one or more executable instructions that, when executed by at least one processor, causes the at least one processor to direct a transmission of a first data piece to an electronic device, when the electronic device is engaged in an initial web browser session on an initial web browser, for storage in an electronic device memory. The first data piece is associated with a first domain that is linked to the initial web browser. The first data piece contains an electronic device identification. The one or more executable instructions that, when executed by at least one processor, also causes the at least one processor to direct a transmission of a second data piece to the electronic device, when the electronic device is engaged in the initial web browser session on the initial web browser, for storage in the electronic device memory. The second data piece is associated with a second domain that is linked to the initial web browser. The second data piece contains the electronic device identification. The one or more executable instructions that, when executed by at least one processor, further causes the at least one processor to retrieve the second data piece from the electronic device memory when the at least one processor is not able to retrieve the first data piece from the electronic device memory. The second data piece retrieved from the electronic device contains the electronic device identification and one or more items of anonymous personal identification information provided by the electronic device during the initial web browser session.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B. and C" includes any of the following combinations: A, B, C, A and B, A and C, B and C, and A and B and C.

Moreover, various functions described below can be implemented or supported by one or more computer programs, each of which is formed from computer readable program code and embodied in a computer readable storage medium. The terms "application" and "program" refer to one or more computer programs, software components, sets of instructions, procedures, functions, objects, classes, instances, related data, or a portion thereof adapted for implementation in a suitable computer readable program code. The phrases "computer readable program code" and "executable instruction" includes any type of computer code, including source code, object code, and executable code. The phrase "computer readable medium" and "computer-readable storage medium" includes any type of medium capable of being accessed by a computer or a processor, such as read only memory (ROM), random access memory (RAM), a hard disk drive, a compact disc (CD), a digital video disc (DVD), or any other type of memory. A "non-transitory" computer-readable medium and a "non-transitory" computer-readable storage medium exclude wired, wireless, optical, or other communication links that transport transitory electrical or other signals. A non-transitory, computer-readable medium and a non-transitory, computer-readable storage medium include media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 11, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
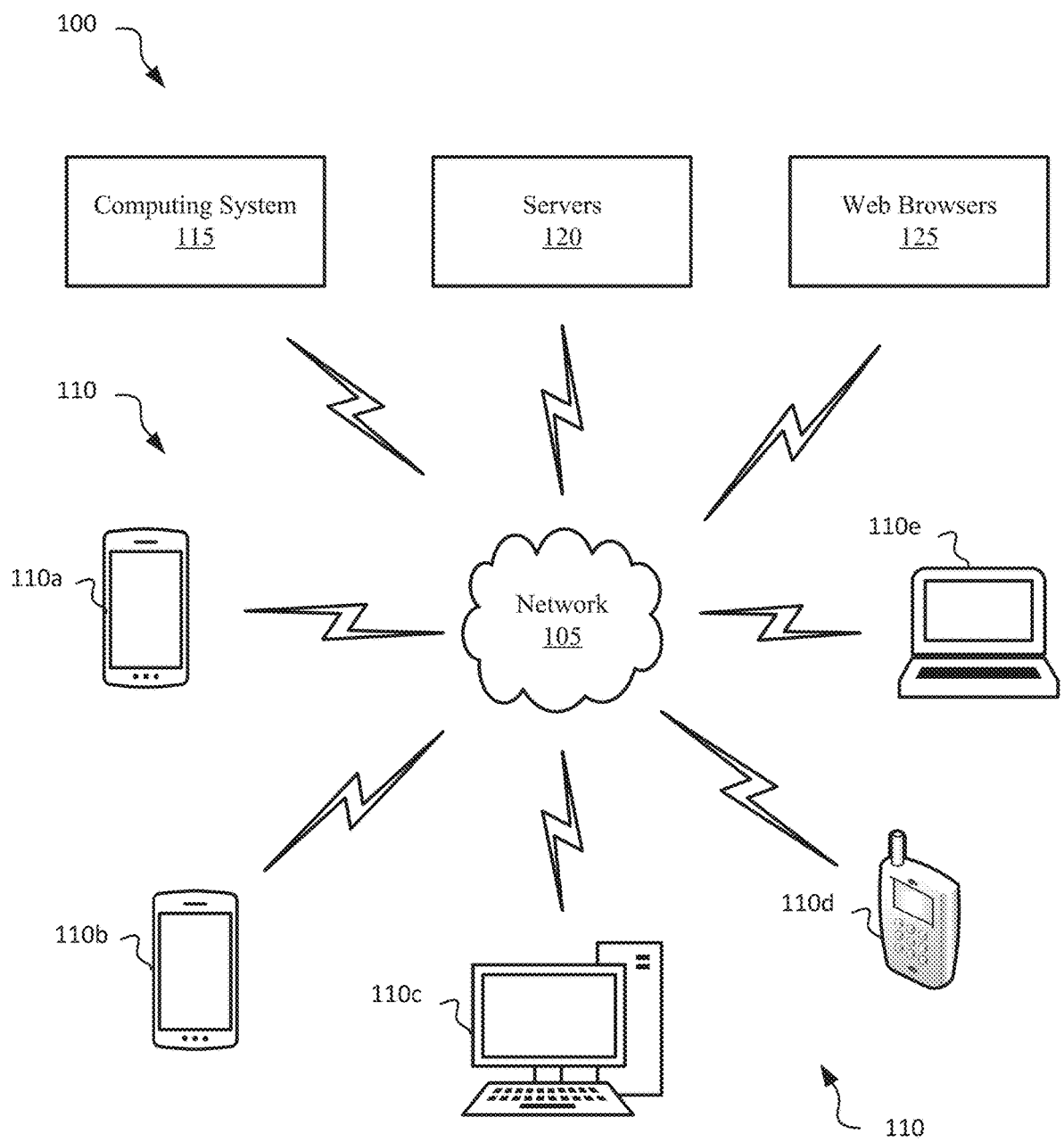
FIG. 1 illustrates a non-limiting, example network context 100 for operating a computing system 115 according to certain embodiments of this disclosure.

FIG. 1 illustrates a non-limiting, example network context 100 for operating a computing system 115 according to certain embodiments of this disclosure. One or more components of the network context 100 may operate as separate components linked by one or more constituent networks of the network 105. In some embodiments, one or more constituent networks of the network 105 may include the internet, which can be accessed over both wired connections (e.g., an Ethernet connection) or over a wireless connection (e.g., a wireless local area network "WLAN" connection or a cellular network connection). Additionally, or alternatively, one or more constituent networks of the network 105 may include a combination of private networks (e.g., a local wireless mesh network) and public networks (e.g., a telephone (POTS) network). In certain embodiments, one or more constituent networks of the network 105 may support multiple communication protocols, including both wireless protocols (e.g., BLUETOOTH™, circuit-switched cellular, 3G, LTE, WiBro) and internet protocols (e.g., HTTP).

The one or more constituent networks of the network 105 provide two-way connectivity between each of the electronic devices 110, the computing system 115, the one or more servers 120, and the one or more web browsers 125. In certain embodiments, the one or more constituent networks of the network 105 provide two-way connectivity between each of the electronic device 110, the computing system 115, the one or more servers 120, and the one or more web browsers 125 using one or more same or different channels, protocols, or networks of network 105. For example, a circuit-switched cellular protocol wireless network of the network 105 provides connectivity between the iPhone™ 110a and one or more of the web browsers 125 while a POTS wireless network of the network 105 provides connectivity between the smartphone 110c and at least one of the one or more web browsers 125.

In certain embodiments, the network context 100 includes one or more electronic devices 110. The one or more electronic devices 110 may include an iPhone™ 110a, a tablet 110b, a desktop computer 110c, a smartphone 110d, a laptop computer 110e, or the like. In certain embodiments, each of the one or more electronic devices 110 are configured to initiate a web browser session with a web browser 125 or access and display the one or more web browsers 125 through the network 105 for viewing by a user and for interaction between the user and the one or more web browsers 125. In certain embodiments, each of the one or more electronic devices 110 are configured to store data pieces associated with the web browser 125. The data piece may contain at least one of an electronic device identification or one or more items of anonymous personal identification information. In certain embodiments, the electronic device 110 transmits anonymous personal identification information to the web browser 125 during a web browser session where the anonymous personal identification information also includes an open source software footprint. In certain embodiments, the electronic device 110 includes an electronic device display screen, an electronic device memory, and at least one electronic device processor. The electronic device may be configured to access and display content from one or more web browsers 125 on the electronic device display screen.

In certain embodiments, the network context 100 includes one or more web browsers 125. As described herein, the one or more web browsers 125 are configured to contain display content for viewing by an electronic device 110 when the electronic device 110 is engaged in a web browser session with the web browser 125. In certain embodiments, the one or more web browsers are configured to transmit data pieces to the electronic device 110 for storage in a memory of the electronic device 110 when the electronic device 110 is engaged in a web browser session with the web browser 125. The one or more web browsers 125 may also be configured to receive anonymous personal identification information from an electronic device 110 when the electronic device 110 is engage in a web browser session with the one or more web browsers 125.

Additionally, the network context 100 may, according to certain embodiments, include one or more servers 120. In certain embodiments, the one or more servers 120 stores user profiles that include electronic device identifications and items of anonymous personal identification information. As described herein, the computing system 115 may store electronic device identifications and one or more items of anonymous personal identification information in selected user profiles stored in the one or more servers 120.

Figure 2:
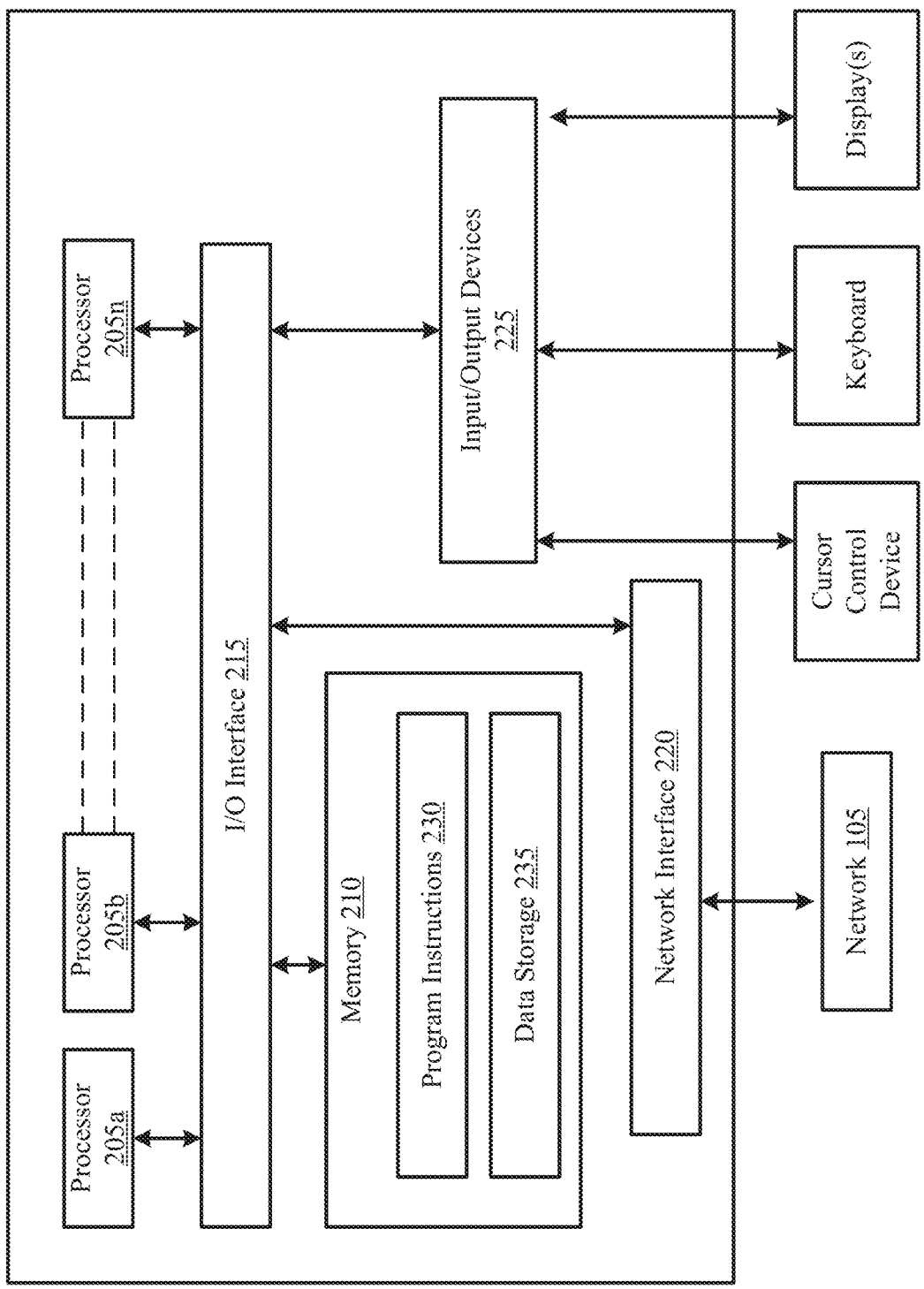
FIG. 2 illustrates a non-limiting, example computing system configured to perform network interruption remedy operations according to certain embodiments of the disclosure.

In certain embodiments, the network context 100 includes one or more computing systems 115. FIG. 2 illustrates a non-limiting, example of the computing system 115 illustrated in FIG. 1. The computing system 115 is configured to execute any and all of the embodiments and operations described herein including embodiments for performing network interruption remedy operations. In certain embodiments, the computing system 115 may perform network interruption remedy operations for overcoming interruptions in network traffic to access anonymous personal identification information provided during a web browser session. In different embodiments, the computing system 115 may be any of various types of devices, including, but not limited to, a computer embedded in an appliance, a personal computer system, a desktop computer, a handset, a laptop computer, a notebook computer, a tablet, a slate, a netbook computer, a handheld computer, a consumer device, a portable storage device, a mainframe computer system, a workstation, network computer, a mobile device, an application server, a storage device, a peripheral device such as a switch, modem, router, or in general any type of electronic computing device.

Various embodiments of a system and method for performing network interruption remedy operations, as described herein, may be executed on one or more computing systems 115, which may interact with various other devices. In the illustrated embodiment, the computing system 115 includes one or more processors 205a, 205b, . . . , and 205n (hereinafter "one or more processors 205," "processor 205," or "processors 205") coupled to a memory 210 via an input/output (I/O) interface 215. The computing system 115 further includes a network interface 220 coupled to I/O interface 215, and one or more input/output devices 225, such as cursor control device, keyboard, and display(s). In some cases, it is contemplated that embodiments may be implemented using a single instance of the computing system 115, while in other embodiments multiple such systems, or multiple nodes making up the computing system 115, may be configured to host different portions or instances of embodiments. For example, in one embodiment, some elements may be implemented via one or more nodes of the computing system 115 that are distinct from those nodes implementing other elements.

In various embodiments, the computing system 115 may be a uniprocessor system including one processor 205a, or a multiprocessor system including several processors 205a-205n (e.g., two, four, eight, or another suitable number). The processor 205 may be any suitable processor capable of executing instructions or operations including networking interference remedy operations as described herein. For example, in various embodiments the processor 205 may be general-purpose or embedded processors implementing any of a variety of instruction set architectures (ISAs), such as the x86, PowerPC, SPARC, or MIPS ISAs, or any other suitable ISA. In multiprocessor systems, each of processors 205 may commonly, but not necessarily, implement the same ISA.

The memory 210 may be configured to store the executable instructions or program instructions 230 or existing state information and ownership transition condition data in the data storage 235 accessible by the processor 205. In various embodiments, the memory 210 may be implemented using any suitable memory technology, such as static random access memory (SRAM), synchronous dynamic RAM (SDRAM), nonvolatile/Flash-type memory, or any other type of memory. In the illustrated embodiment, the program instructions 230 may be configured to implement a system for overcoming network interruptions incorporating any of the functionality, as described herein. In some embodiments, program instructions 230 or data may be received, sent, or stored upon different types of computer-accessible media or on similar media separate from the memory 210 or the computing system 115. The computing system 115 is described as implementing at least some of the functionality of functional blocks in the figures described herein.

Figure 3A:
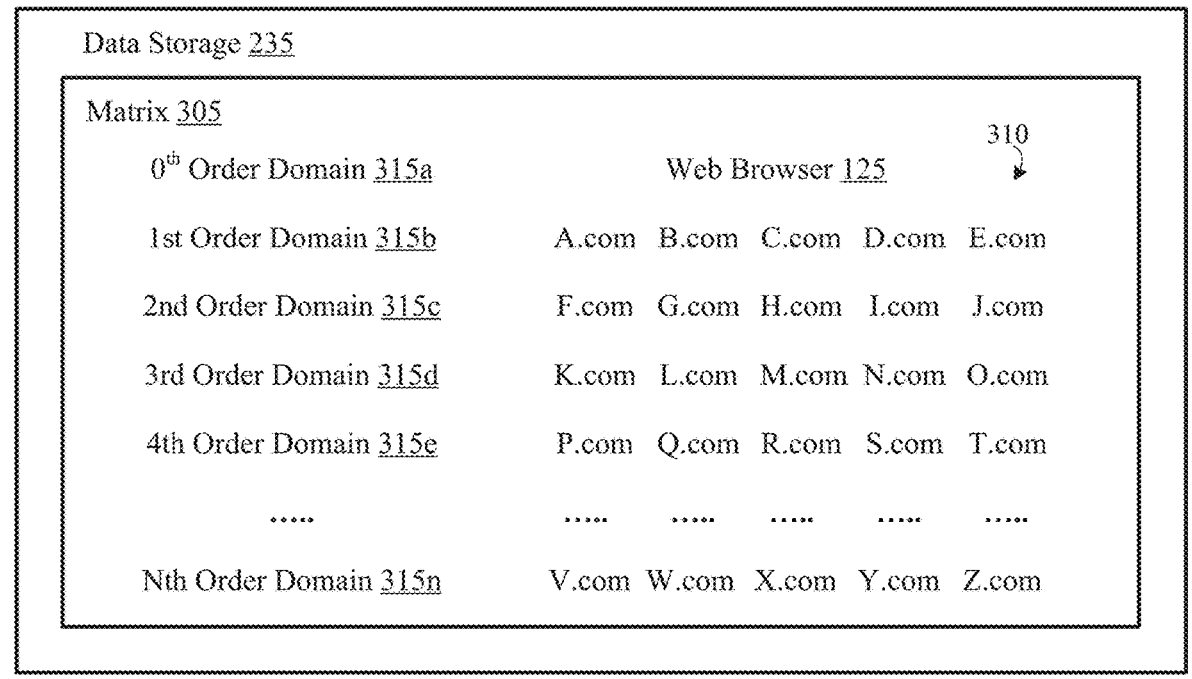
FIGS. 3A and 3B illustrate example matrices of domains linked with web browsers according to certain embodiments of this disclosure.
Figure 3B:
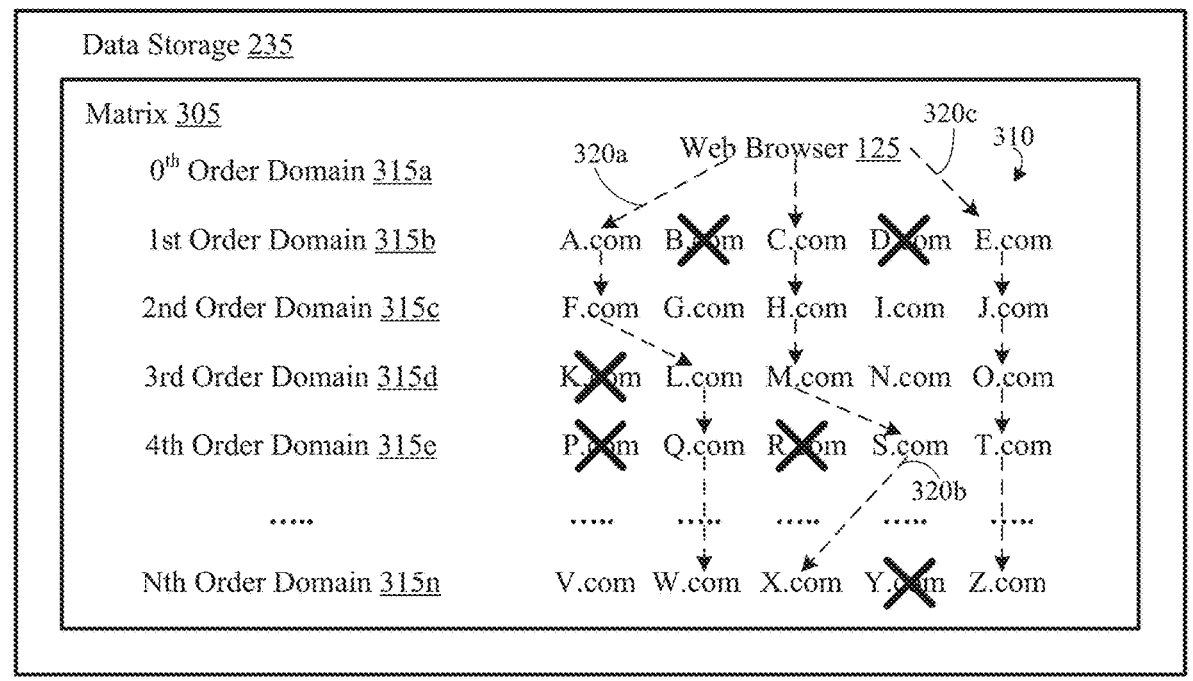

In certain embodiments, the data storage 235 of the memory 210 stores a plurality of domains that can be linked to one or more web browsers 125. FIGS. 3A and 3B illustrate an example matrix 305 of a plurality of domains 310 stored in the data storage 235 of the memory 210 and capable of being linked with one or more web browsers 125 according to certain embodiments of this disclosure. As shown in FIG. 3A, the matrix 305 contains a plurality of rows and a plurality of columns forming a plurality of fields each containing a domain (e.g., "A.com," "G.com," S.com"). Each of the plurality of rows may be assigned an order that the at least one processor 205 uses for directing an electronic device 110 to transmit anonymous personal identification information to domains and for domains to transmit data pieces containing the transmitted anonymous personal identification information for storage in a memory of the electronic device 110, as described herein. As shown in FIG. 3A, the web browser 125 is positioned in the $0^{th}$ Order Domain row 315a, the domains "A.com." "B.com," "C.com." "D.com." and "E.com" are positioned in the $1^{st}$ Order Domain row 315b, the domains "F.com," "G.com," "H.com," "I.com," and "J.com" are positioned in the $2^{nd}$ Order Domain row 315c, the domains "K.com," "L.com," "M.com." "N.com," and "O.com" are positioned in the $3^{rd}$ Order Domain row 315d, the domains "P.com," "Q.com," "R.com," "S.com," and "T.com" are positioned in the $4^{th}$ Order Domain row 315e, and the domains "V.com."

"W.com," "X.com." "Y.com," and "Z.com" are positioned in the $N^{th}$ Order Domain row 315n.

It should be understood that the matrix 305 can include a plurality of columns (e.g., hundreds of columns, thousands of columns, millions of columns) and a plurality of rows (e.g., hundreds of rows, thousands of rows, millions of rows) and thus, a plurality of domains (e.g., hundreds of domains, thousands of domains, millions of domains) may be stored in the matrix 305. In addition, the data storage 235 of the memory 210 may store a plurality of matrices (e.g., hundreds of matrices, thousands of matrices, millions of matrices) each of which having a different web browser 125 in the $0^{th}$ Order Domain and thus, each of which being associated with a different web browser 125. Additionally, or alternatively, the data storage 235 of the memory 210 may store one or more matrices 305 that are each associated with two or more different web browsers 125. The matrix 305 provides the at least one processor 205 with a road map having alternative pathways through the domain orders for directing an electronic device 110 to communicate items of anonymous personal identification information to domains in each of the domain orders. The electronic device 110 may then receive and store data pieces from those domains on the electronic device 110 when the electronic device 110 is engaged in browser sessions on web browsers 125. The data pieces stored on the electronic device 110 may contain the transmitted items of personal identification information and an electronic device identification. The data pieces can subsequently be retrieved by the at least one processor 205 so that the at least one processor 205 may store electronic device identifications and items of anonymous personal identification information from the retrieved data pieces in user profiles in one or more servers 120.

In certain embodiments, the I/O interface 215 may be configured to coordinate I/O traffic between the processor 205, the memory 210, and any peripheral devices in the computing system 115, including the network interface 220 or other peripheral interfaces, such as the input/output devices 225. In some embodiments, the I/O interface 215 may perform any necessary protocol, timing or other data transformations to convert data signals from one component (e.g., the memory 210) into a format suitable for use by another component (e.g., the processor 205). In some embodiments, the I/O interface 215 may include support for devices attached through various types of peripheral buses, such as a variant of the Peripheral Component Interconnect (PCI) bus standard or the Universal Serial Bus (USB) standard, for example. In some embodiments, the function of the I/O interface 215 may be split into two or more separate components, such as a north bridge and a south bridge, for example. Also, in some embodiments some or all of the functionality of the I/O interface 215, such as an interface to the memory 210, may be incorporated directly into the processor 205.

The network interface 220 may be configured to allow data to be exchanged between the computing system 115 and other devices attached to the network 105 (e.g., one or more electronic devices 110, one or more servers 120, one or more web browsers 125) or between nodes of the computing system 115. The network 105 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof, or the like. In various embodiments, the network interface 220 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network or protocol.

The input/output devices 225 may, in some embodiments, include one or more display terminals, keyboards, keypads, touchpads, scanning devices, voice, or optical recognition devices, or any other devices suitable for entering or accessing data by one or more the computing system 115. Further, various other sensors may be included in the I/O devices 225, such as imaging sensors, barometers, altimeters, LIDAR, or any suitable environmental sensor. Multiple input/output devices 225 may be present in the computing system 115 or may be distributed on various nodes of the computing system 115. In some embodiments, similar input/output devices may be separate from the computing system 115 and may interact with one or more nodes of the computing system 115 through a wired or wireless connection, such as over the network interface 220.

As shown in FIG. 2, the memory 210 may include program instructions 230, which may be processor-executable to implement any element, action, or operation including network interruption remedy operations, as described herein. In certain embodiment, the program instructions may implement at least a portion of methods described herein, such as the methods illustrated by FIGS. 4-10. In other embodiments, different elements and data may be included. Note that the data storage 235 may include any data or information, as described herein.

Those skilled in the art will appreciate that the computing system 115 is merely illustrative and is not intended to limit the scope of embodiments. In particular, the computing system and devices may include any combination of hardware or software that can perform the indicated functions, including computers, network devices, Internet appliances, PDAs, wireless phones, pagers. GPUs, specialized computer systems, information handling apparatuses, or the like. The computing system 115 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system 115 via inter-computer communication. Some or all of the system components or data structures may also be stored (e.g., as instructions or structured data) on a computer-accessible medium or a portable article to be read by an appropriate drive, various examples of which are described here. In some embodiments, instructions stored on a computer-accessible medium separate from the computing system 115 may be transmitted to the computing system 115 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media. e.g., disk or DVD/CD-ROM, volatile or non-volatile media such as RAM (e.g., SDRAM, DDR, RDRAM, SRAM, or the like), ROM, or the like. In some embodiments, a computer-accessible medium may include transmission media or signals such as electrical, electromagnetic, or digital signals, conveyed via a communication medium such as network and/or a wireless link.

As described herein, the computing system 115, utilizing the at least one processor 205, is configured to perform one or more networking interruption remedy operations. In certain embodiments, the computing system 115, utilizing one or more processors 205 determines that an electronic device 110 has initiated an engagement in a web browser session with the web browser 125 or that an electronic device 110 has requested content from the web browser 125. For example, the electronic device 110 may be used to initiate a web browser session with a web browser 125 and display content from the web browser 125 on a display screen. The computing system 115 utilizing the one or more processors 125 may be configured to detect or determine that the electronic device 110 has initiated an engagement into a web browser session with a web browser 125, that the electronic device 110 is engaged in a web browser session with a web browser 125, or that an electronic device 110 has requested content from the web browser 125 while the electronic device 110 is engaged in a web browser session with the web browser 125. Upon engaging in the web browser session with the web browser 125, the electronic device 110 receives a data piece associated with the web browser 125 and stores the data piece in a memory of electronic device 110. The data piece received from the web browser 125 and stored in the memory of electronic device 110 includes an electronic device identification that is unique to the electronic device 110. An electronic device identification may include at least one of a MAC address, an IMEI number, an electronic device serial number, a pointer associated with a data port of the electronic device, or the like. The data piece may be used for storing one or more items of anonymous personal identification information that is also transmitted during the browser session. It should be understood that the one or more items of anonymous personal identification information may include one or more of an email address, a postal address, a user ID, a gender, an age group, a user interest, or the like. In certain embodiments, each of the one or more items of anonymous personal identification information may include a hash value.

Subsequently, the computing system 115 accesses one or more matrices 305 stored in the data storage 235 of the memory 210. The one or more matrices 305 may be associated with one or more types of data piece blocking software that may be stored on the electronic device 110. Additionally, or alternatively, the one or more matrices 305 may be associated with the web browser 125 that the electronic device 110 is engaged with. Turning to FIG. 3B, the computing system 115 identifies a plurality of domains 310 from the matrix 305 that are associated with the web browser 125 and determines which of those domains can transmit data pieces to the electronic device 110 that are retrievable by the computing system 115 during or after the web browser session between the electronic device 110 and the web browser 125.

In certain embodiments, the one or more electronic devices 110 may store and execute data piece blocking software (e.g., anti-identification software, pop-up blocker software, advertisement (ad) blocker software). The data piece blocking software may flag or block specific strings of HTML code contained in certain data pieces or may flag or block data pieces associated with entire domains. The data piece blocking software may flag or block a data piece due to a specific string of HTML code contained in the data piece. Additionally, or alternatively, the data piece blocking software may block access to all data pieces from particular domains which are residing in the electronic device memory. In certain embodiments, the data piece blocking software may not flag or block particular data pieces due to a lack of a specific string of HTML code contained in the particular data pieces that would cause the data piece blocking software to block the particular data pieces. Additionally, or alternatively, the data piece blocking software may not block access to data pieces from particular domains which are residing in the electronic device memory.

When the computing system 115 accesses the one or more matrices 305 stored in the data storage 235 of the memory 210, the computing system 115 or the web browser 125 generates a data piece to be transmitted by the web browser 125. The data piece is configured for storage in the memory of the electronic device 110 and includes electronic device information and one or more items of anonymous personal identification information transmitted by the electronic device 110 to the web browser 125. Subsequently, the computing system 115 may retrieve or receive the electronic device information and the one or more items of anonymous personal identification information contained in the data piece stored in the memory of the electronic device 110.

In addition, the data piece may contain a first instruction to the electronic device 110. The first instruction may identify one or more domains in the $1^{st}$ Order Domain 315$b$ and instruct the electronic device 110 to initiate communication with those one or more domains. For example, after receiving the first instruction, the electronic device 110 may initiate communication with or transmit one or more items of anonymous personal identification information to a first domain of the one or more domains in the $1^{st}$ Order Domain 315$b$ indicated in the first instruction. After initiating communication with or transmitting the one or more items of anonymous personal identification information to the first domain of the one or more domains from the $1^{st}$ Order Domain 315$b$, the data piece blocking software executed by the electronic device 110 may block the reception of a data piece from the first domain of the one or more domains in the $1^{st}$ Order Domain 315$b$ identified in the first instruction.

While the electronic device 110 initiates communication with or transmits one or more items of anonymous to the first domain of the $1^{st}$ Order Domain 315$b$ or during or after (e.g., in response to) the data piece blocking software on the electronic device 110 blocks the data piece from the first domain of the $1^{st}$ Order Domain 315$b$, the first instruction may instruct the electronic device 110 to initiate communication with or transmit one or more items of anonymous personal identification information to a second domain of the one or more domains in the $1^{st}$ Order Domain 315$b$ indicated in the first instruction. After initiating communication with or transmitting the one or more items of anonymous personal identification information to the second domain of the one or more domains from the $1^{st}$ Order Domain 315$b$, a data piece (e.g., generated by the computing system 115, generated by the second domain) may be transmitted to the electronic device 110 from the second domain and stored in a memory of the electronic device 110. Subsequently, the computing system 115 may attempt to retrieve (e.g., through the second domain) an electronic device identification and one or more item of anonymous personal identification information contained in the data piece from the second domain. During or after the computing system 115 attempts to retrieve the electronic device identification and the one or more item of anonymous personal identification information stored in the data piece from the second domain, the data piece blocking software may block the retrieval of the electronic device identification and the one or more item of anonymous personal identification information stored in the data piece from the second domain.

While the electronic device 110 initiates communication with or transmits one or more items of anonymous to the second domain of the $1^{st}$ Order Domain 315b or during or after (e.g., in response to) the data piece blocking software on the electronic device 110 blocks access to the data piece from the second domain of the $1^{st}$ Order Domain 315b, the first instruction may instruct the electronic device 110 to initiate communication with or transmit one or more items of anonymous personal identification information to a third domain of the one or more domains in the $1^{st}$ Order Domain 315b indicated in the first instruction. After initiating communication with or transmitting the one or more items of anonymous personal identification information to the third domain of the one or more domains from the $1^{st}$ Order Domain 315b, a data piece (e.g., generated by the computing system 115, generated by the third domain) may be transmitted to the electronic device 110 from the third domain and stored in a memory of the electronic device 110. Subsequently, the computing system 115 may successfully retrieve (e.g., through the third domain) an electronic device identification and one or more item of anonymous personal identification information stored in the data piece from the third domain.

In certain embodiments, after the computing system 115 successfully receives the electronic device identification and the one or more item of anonymous personal identification information stored in the data piece from a domain from the $1^{st}$ Order Domain 315b, the first instruction may instruct the electronic device 110 to not transmit one or more item of anonymous personal identification information to another domain of the $1^{st}$ Order Domain 315b. In this case, a second instruction included in a data piece that was successfully received by computing system 115 from the electronic device 110 may instruct the electronic device to initiate communication with or transmit one or more item of anonymous personal identification information to one or more domains in a $2^{nd}$ Order Domain 315c indicated in the second instruction, described herein.

Alternatively, the first instruction may instruct the electronic device 110 to initiate communication with or transmit one or more item of anonymous personal identification information to all of the domain of the $1^{st}$ Order Domain 315b indicated by the first instruction before initiating instructions contained in a data piece from a domain of the $1^{st}$ Order Domain 315b. For example, while the electronic device 110 communicates with or transmits one or more item of anonymous personal identification information to the third domain of the $1^{st}$ Order Domain 315b or during or after (e.g., in response to) the computing system 115 receives a data piece from the third domain of the $1^{st}$ Order Domain 315b, the first instruction may instruct the electronic device 110 to initiate communication with or transmit one or more items of anonymous personal identification information to a fourth domain of the one or more domains in the $1^{st}$ Order Domain 315b indicated in the first instruction. After initiating communication with or transmitting the one or more items of anonymous personal identification information to the fourth domain of the one or more domains from the $1^{st}$ Order Domain 315b, a data piece (e.g., generated by the computing system 115, generated by the fourth domain) may be transmitted to the electronic device 110 from the fourth domain and stored in a memory of the electronic device 110. Subsequently, the computing system 115 may successfully retrieve (e.g., through the fourth domain) an electronic device identification and one or more item of anonymous personal identification information stored in the data piece from the fourth domain.

The first instruction may cause the electronic device 110 to initiate communication with or transmit one or more items of anonymous personal identification information to each domain of the one or more domains from the $1^{st}$ Order Domain 315b identified in the first instruction. Thus, the computing system 115 may be able to retrieve, from an electronic device 110, electronic device information and one or more items of anonymous personal identification information stored in data pieces from one or more domains of the $1^{st}$ Order domain 315b that are not blocked from storing data pieces in the memory of the electronic device 110 by data piece blocking software. Additionally, or alternatively, the computing system 115 may be able to retrieve, from an electronic device 110, electronic device information and one or more items of anonymous personal identification information stored in data pieces from one or more domains of the $1^{st}$ Order domain 315b that are not blocked by data piece blocking software from being access from the memory of the electronic device 110. In certain embodiments, upon receiving electronic device information and one or more items of anonymous personal identification information from at least one domain of the one or more domains from the $1^{st}$ Order Domain 315b identified by the first instruction, the computing system 115 may determine which domains provided data pieces that are blocked and that are not blocked by data piece blocking software on the electronic device 110. The computing system 115 may designate a matrix for the data piece blocking software or the electronic device 115 and indicate (e.g., record a notation in the matrix) which domains are blocked and not blocked by the electronic device 110 or the data piece blocking software executed on the electronic device 110.

In certain embodiments, a data piece transmitted to an electronic device 110 through a domain of the one or more domains in the $1^{st}$ Order Domain 315b and stored in a memory of the electronic device 110 may contain a second instruction. The second instruction may identify one or more domains in the $2^{nd}$ Order Domain 315c and instruct the electronic device 110 to initiate communication with those one or more domains. For example, a data piece from a domain of the $1^{st}$ Order Domain 315b may not have been blocked by data piece blocking software and thus may be stored in a memory of an electric device 110. In certain embodiments, access to the data piece, after the data piece is stored in the memory of the electronic device 110, may not be blocked by data piece blocking software and thus may be accessible by a processor of the electronic device 110 or the computing system 115. The data piece from the domain of the $1^{st}$ Order Domain 315b may contain a second instruction.

After receiving the second instruction, the electronic device 110 may process the second instruction and initiate communication with or transmit one or more items of anonymous personal identification information to a first domain of one or more domains in the $2^{nd}$ Order Domain 315c indicated in the second instruction. After initiating communication with or transmitting the one or more items of anonymous personal identification information to the first domain of the one or more domains from the $2^{nd}$ Order Domain 315c, the data piece blocking software executed by the electronic device 110 may block the reception of a data piece from the first domain of the $2^{nd}$ Order Domain 315c identified in the second instruction.

While the electronic device 110 communicates with or transmits one or more items of anonymous to the first domain of the $2^{nd}$ Order Domain 315c or during or after (e.g., in response to) the data piece blocking software on the electronic device 110 blocks the data piece from the first domain of the $2^{nd}$ Order Domain 315c, the second instruction may instruct the electronic device 110 to initiate communication with or transmit one or more items of anonymous personal identification information to a second domain of the one or more domains in the $2^{nd}$ Order Domain 315c indicated in the second instruction. After initiating communication with or transmitting the one or more items of anonymous personal identification information to the second domain of the one or more domains from the $2^{nd}$ Order Domain 315c, a data piece (e.g., generated by the computing system 115, generated by the second domain) may be transmitted to the electronic device 110 from the second domain and stored in a memory of the electronic device 110. Subsequently, the computing system 115 may attempt to retrieve (e.g., through the second domain) electronic device identification and one or more item of anonymous personal identification information contained in the data piece from the second domain. During or after the computing system 115 attempts to retrieve the electronic device identification and the one or more item of anonymous personal identification information stored in the data piece from the second domain, the data piece blocking software may block the retrieval of the electronic device identification and the one or more item of anonymous personal identification information stored in the data piece from the second domain.

While the electronic device 110 communicates with or transmits one or more items of anonymous to the second domain of the $2^{nd}$ Order Domain 315c or during or after (e.g., in response to) the data piece blocking software on the electronic device 110 blocks access to the data piece from the second domain of the $2^{nd}$ Order Domain 315c, the second instruction may instruct the electronic device 110 to initiate communication with or transmit one or more items of anonymous personal identification information to a third domain of the one or more domains in the $2^{nd}$ Order Domain 315b indicated in the second instruction. After initiating communication with or transmitting the one or more items of anonymous personal identification information to the third domain of the one or more domains from the $2^{nd}$ Order Domain 315c, a data piece (e.g., generated by the computing system 115, generated by the third domain) may be transmitted to the electronic device 110 from the third domain and stored in a memory of the electronic device 110. Subsequently, the computing system 115 may successfully retrieve (e.g., through the third domain) electronic device identification and one or more item of anonymous personal identification information stored in the data piece from the third domain.

In certain embodiments, after the computing system 115 successfully receives the electronic device identification and the one or more item of anonymous personal identification information stored in the data piece from a domain from the $2^{nd}$ Order Domain 315c, the second instruction may instruct the electronic device 110 to not initiate communication with or not transmit one or more item of anonymous personal identification information to another domain of the $2^{nd}$ Order Domain 315c. In this case, a third instruction included in a data piece that was successfully received by computing system 115 may instruct the electronic device to initiate communication with or transmit one or more item of anonymous personal identification information to one or more domains in a $3^{rd}$ Order Domain 315d indicated in the third instruction.

Alternatively, the second instruction may instruct the electronic device 110 to initiate communication with or transmit one or more item of anonymous personal identification information to all of the domain of the $2^{nd}$ Order Domain 315c indicated by the second instruction before initiating the instructions contained in a data piece from a domain of the $2^{nd}$ Order Domain 315c. For example, while the electronic device 110 communicates with or transmits one or more items of anonymous personal identification information to the third domain of the $2^{nd}$ Order Domain 315c or during or after (e.g., in response to) the computing system 115 receives the data piece from the third domain of the $2^{nd}$ Order Domain 315c, the second instruction may instruct the electronic device 110 to initiate communication with or transmit one or more items of anonymous personal identification information to a fourth domain of the one or more domains in the $2^{nd}$ Order Domain 315c indicated in the second instruction. After initiating communication with or transmitting the one or more items of anonymous personal identification information to the fourth domain of the one or more domains from the $2^{nd}$ Order Domain 315c, a data piece (e.g., generated by the computing system 115, generated by the fourth domain) may be transmitted to the electronic device 110 from the fourth domain and stored in a memory of the electronic device 110. Subsequently, the computing system 115 may successfully retrieve (e.g., through the fourth domain) the electronic device identification and the one or more item of anonymous personal identification information stored in the data piece from the fourth domain.

As described herein, the second instruction may cause the electronic device 110 to initiate communication with or transmit one or more items of anonymous personal identification information to each domain of the one or more domains from the $2^{nd}$ Order Domain 315c identified in the second instruction. Thus, the computing system 115 may be able to retrieve, from an electronic device 110, electronic device information and one or more items of anonymous personal identification information stored in data pieces from one or more domains of the $2^{nd}$ Order domain 315c that are not blocked from storing data pieces in the memory of the electronic device 110 by data piece blocking software. Additionally, or alternatively, the computing system 115 may be able to retrieve, from an electronic device 110, electronic device information and one or more items of anonymous personal identification information stored in data pieces from one or more domains of the $2^{nd}$ Order domain 315c that are not blocked by data piece blocking software from being access from the memory of the electronic device 110.

In certain embodiments, upon receiving electronic device information and one or more items of anonymous personal identification information from at least one domain of the one or more domains from the $2^{nd}$ Order Domain 315c identified by the first instruction, the computing system 115 may determine which domains provided data pieces that are blocked and that are not blocked by data piece blocking software on the electronic device 110. The computing system 115 may use the designated matrix for the data piece blocking software or the electronic device 115 and indicate (e.g., record a notation in the matrix) which domains are blocked and not blocked by the electronic device 110 or the data piece blocking software executed on the electronic device 110. The electronic device 110 may receive data pieces from a plurality of domains in a plurality of Order Domains from the $3^{rd}$ Order Domain 315d, to the $4^{th}$ Order Domain 315e, to the Nth Order Domain 315n.

In certain embodiments, after the data pieces are transmitted to the electronic device 110 and stored in the memory of electronic device 110, the computing system 115 attempts to retrieve each of the data pieces stored in the memory of electronic device 110 (e.g., through each of the domains). In certain embodiments, the computing system 115 attempts to retrieve each of the data pieces stored in the memory electronic device 110 regardless of whether the electronic device 110 has transmitted one or more items of anonymous personal identification information to the web browser 125. For example, after the computing system 115 has transmitted each of the data pieces through the domains to the electronic device 110 for storage in the memory of electronic device 110, the computing system 115 initiates a retrieval test to determine which, if any, data pieces the computing system 110 is able to retrieve. The retrieval test may allow the computing system 115 to determine which data pieces are not retrievable from the memory of electronic device 110 due to data piece blocking software and what data pieces are retrievable from the memory of the device 110. The retrieval test may be performed by attempting to retrieve the electronic device identification contained in each of the data pieces. Thus, the computing system 115 may determine which data pieces can be retrieved from the memory of electronic device 110 and which data pieces cannot be retrieved from the memory of the electronic device 110 regardless of whether the electronic device 110 has transmitted items of anonymous personal identification information to the web browser 125. Subsequently, the computing system 115 may seek to retrieve from the memory of electronic device 110 only those data pieces determined to be retrievable by the retrieval test for storage of electronic device identifications and items of anonymous personal identification information for storage in the server 120.

In certain embodiments, the computing system 115 attempts to retrieve each of the data pieces stored in the memory of electronic device 110 after the electronic device 110 has transmitted one or more items of anonymous personal identification information to the web browser 125 (e.g., through each of the domains). For example, after the computing system 115 has transmitted each of the data pieces to the electronic device 110 for storage in the memory of electronic device 110 and after the electronic device 110 has transmitted one or more items of anonymous personal identification information to the web browser 125 during the web browser session, the computing system 115 initiates data piece retrieval to retrieve the data pieces associated with the each of the domains from the matrix 305 and stored in the memory of electronic device 110. In response to initiating the data piece retrieval, the computing system 115 retrieves only some of the data pieces previously stored in the memory of electronic device 110. Based on determining which data pieces have been retrieved and which data pieces have not been retrieved, the computing system 115 determines which, if any, data pieces the computing system 110 is able to retrieve. Subsequently, the computing system 115 may seek to retrieve from the memory of electronic device 110 only those data pieces determined to be retrievable and containing subsequently transmitted electronic device identifications and items of anonymous personal information for storage in the server 120.

After (e.g., in response to) determining which data pieces can be retrieved from the memory of the electronic device 110 and which data pieces cannot be retrieved from the memory of the electronic device 110, the computing system 115 marks each of the domains in the matrix 305 that are associated with data pieces that cannot be retrieved and links each of the domains in the matrix 305 into one or more chains of data pieces that can provide retrievable data pieces from the memory of electronic device 110 by the computing system 115. For example as shown in FIG. 3B, the computing system 115 marks "B.com" and "D.com" from the $1^{st}$ Order Domain 315b, "K.com" from the $3^{rd}$ Order Domain 315d, "P.com" and "R.com" from the $4^{th}$ Order Domain, and "Y.com" from the Nth Order Domain as domains that are associated with data pieces that are not retrievable by the computing system 115. The computing system 115 also forms a first chain 320a of domains ("A.com," "F.com." L.com," "Q.com," and "V.com"), a second chain 320b of domains ("C.com," "H.com." M.com." "S.com," and "X.com"), and third chain 320c of domains ("E.com," "J.com," O.com," "T.com," and "Z.com") that are retrievable by the computing system 115 from the memory of electronic device 110. Each of the chains includes a domain from each of the ordered domains 315a through 315n. Thus, using the matrix 305 stored in the data storage 235, the computing system 115 is able to determine which data pieces are retrievable to provide electronic device identification and one or more items of anonymous personal identification information provided by the electronic device 110 during a current web browser session and subsequent web browser sessions with the web browser 125.

In certain embodiments, domains that are linked to the web browser 125 and thus the computing system 115 may be domains that transmit data pieces containing instructions that direct an electronic device 110 to initiate communication with or transmit one or more items of anonymous personal identification information to a domain in an order domain. In certain embodiments, domains that are linked to the web browser 125 and thus the computing system 115 may be domains that provide data pieces that are retrievable by the computing system 115 when those data pieces are stored in a memory of the electronic device 110. In certain embodiments, domains and a web browser 125 that are linked to the computing system 115 may be domains and a web browser that each transmits data pieces generated by the computing system 115 including instructions as described herein.

In certain embodiments, the computing system 115, utilizing one or more processors 205 retrieves the data pieces determined to be retrievable by the computing system 115 from the memory of the electronic device 110. The data pieces retrieved by the computing system 115 include an electronic device identification and one or more items of anonymous personal identification information provided by the electronic device 110 during the web browser session with the web browser 115. In some embodiments, the electronic device 110 will not be storing data piece blocking software and thus all data pieces stored on the memory of the electronic device 110 by the computing system 115 are retrievable and thus retrieved by the computing system 115. In some embodiments, some data pieces generated by the computing system 115 and stored in the memory of electronic device 110 may not be retrievable by the computing system 115 from the memory of electronic device 110 due to data piece blocking software stored and executed on electronic device 110. In some embodiments, all data pieces generated by the computing system 115 and stored in the memory of the electronic device 110 may not be retrieval by the computing system 115 from the memory of electronic device 110 due to data piece blocking software stored in the memory of the electronic device 110.

In certain embodiments, the computing system 115, utilizing the at least one processor 205, stores the electronic device identification and the one or more items of anonymous personal identification information from the retrieved data pieces in user profiles of the one or more servers 120. In certain embodiments, the computing system 115 stores the electronic device identification and the one or more items of anonymous personal identification information from the retrieved data pieces in one or more user profile previously created and stored on the one or more servers 120. For example, the computing system 115 may have previously generated one or more user profiles each containing at least one of an electronic device identification or one or more items of anonymous personal identification information provided in a previously obtained data piece. When the computing system 115 receives the retrieved data pieces each containing an electronic device identification and one or more items of anonymous personal identification information, the computing system 115 may match at least one of the electronic device identification or at least one of the one or more items of anonymous personal identification information from a retrieved data piece with at least one of the electronic device identification or at least one of the one or more items of anonymous personal identification information stored in a user profile. When the computing system 115 identifies a match, the computing system 115 may store the electronic device identification and the one or more items anonymous personal identification information from the retrieved data piece in the user profile in the servers 120.

In certain embodiments, the computing system 115, utilizing the at least one processor 205, stores electronic device identification and the one or more items of anonymous personal identity information from the received data pieces in newly created user profiles stored in the one or more servers 120. For example, the computing system 115 may search through the server 120 to identify (e.g., find, locate) user profiles containing at least one of electronic device identification or one of one or more items of anonymous personal identification information that matches at least one of the electronic device identification or one of the one or more items of anonymous personal identification information contained in a retrieved data piece. After searching through the server 120, the computing system 115 may determine that no match exists between at least one of the electronic device identification or one of the one or more items of anonymous personal identification information contained in the retrieved data piece and at least one of electronic device identification or one of one or more items of anonymous personal identification information contained in a user profile of the one or more servers 120. In response, the computing system 115 may create a new user profile in the server 120 and store the electronic device identification and the one or more items of anonymous personal identification information from the retrieved data piece in the newly created user profile.

In certain embodiments, the computing system 115, utilizing the at least one processor 205, stores an additional data piece in the user profile in the server 120 after the computing system 110 has stored retrieved data piece in the same user profile. For example, in response to matching at least one item of the one or more items of anonymous personal identification information from the retrieved data piece with one or more items of anonymous personal identification information from an additional data piece, the computing system 115 may store the additional data piece in the user profile in the server 120. The additional data piece may have obtained from one or more other servers (e.g., not the one or more servers 120) or from another data piece retrieved from another electronic device 110.

In certain embodiments, the data pieces generated by the computing system 115 and retrieved from the electronic device 110 may include a cookie. A cookie (e.g., an HTTP cookie, a web cookie, an Internet cookie, a browser cookie) is a piece of data sent from a website and stored on a memory of an electronic device 110 by a web browser of the electronic device 110 while the electronic device is engaged in a browser session. In certain embodiments, the computing system 115, utilizing the at least one processor 205, maps or associates electronic device identification from a cookie to an open-source software footprint. An open-source software footprint may be a unique set of traceable digital activities, actions, contributions, or communications that are manifested in open-source code on the internet or on electronic devices. The electronic device 110 may transmit one or more items of anonymous personal identification information to the web browser 125 during a browser session. The one or more items of anonymous personal identification information transmitted from the electronic device 110 includes an open-source software footprint that is unique to the electronic device 110 or that provides the computing system 115 with an acceptable level of certainty that the specific electronic device 110 is transmitting the one or more items of anonymous personal identification information.

When the electronic device 110 transmits the one or more items of anonymous personal identification information to the web browser 125, the one or more items of anonymous personal identification information may also be stored in each of the cookies stored in the memory of the electronic device 110 and associated with domains from the matrix 305. While the transmitted one or more items of anonymous personal identification information may not include the electronic device identification, each of the cookies associated with the domains from the matrix 305 includes the electronic device identification. In addition, the one or more items of anonymous personal identification information stored in each of the cookies associated with the domains in the matrix may also include the open-source software footprint. Thus, when the computing system 115 retrieves a cookie associated with a domain in the matrix from the memory of the electronic device 110, the computing system 115 maps or associates the open-source software footprint from the retrieved cookie to the electronic device identification from the retrieved cookie. Accordingly, the computing system 115 maps or associates the open-source software footprint with the specific electronic device 110.

In certain embodiments, the computing system 115, utilizing the at least one processor 205, retrieves an item of personal identification information that is attached to the open-source software footprint. For example, after the computing system 115 has mapped or associated the open-source software footprint from the retrieved cookie to the electronic device identification from the retrieved cookie and the computing system 115 has stored the electronic device identification and the one or more items of anonymous personal identification information from the retrieved cookie in the user profile in the server 120, the electronic device 110 may engage in a subsequent web browser session with a web browser 125 (e.g., the same web browser, another web browser). During the subsequent web browser session, the electronic device 110 may transmit one or more items of anonymous personal identification information to the web browser 125. The one or more items of anonymous personal notification information transmitted to the web browser 125 during the subsequent web browser session may be different items of anonymous personal identification information from the one or more items of anonymous personal identification information transmitted the web browser during the initial web browser session.

The one or more items of anonymous personal identification information transmitted from the electronic device 110 during the subsequent web browser session may include the open-source software footprint. The computing system 115 may intercept, receive, or retrieve the transmitted one or more items of anonymous personal identification information transmitted from the electronic device 110 during the subsequent web browser session and identify that the one or more items of anonymous personal identification information includes the open-source software footprint. The computing system 115 may then map or associate the one or more items of anonymous personal identification information transmitted by the electronic device 110 during the subsequent web browser session with the previously provided electronic device identification from the retrieved cookie based on the open-source software footprint. Based on mapping the electronic device identification with the open-source software footprint during the initial web browser session, the computing system 115 may identify that the electronic device 110 is the source of the one or more items of anonymous personal identification information transmitted during the subsequent web browser session without relying on a cookie.

In certain embodiments, the computing system 115, utilizing the at least one processor 205, stores the one or more items of anonymous personal identification information in the user profile in the server 120 based on the attached open-source software footprint. In certain embodiments, the computing system 115 stores the one or more items of anonymous personal identification information transmitted during the subsequent browser session in the user profile in the server 120 based on the attached open-source software footprint. For example, the computing system 115 may have determined that the one or more items of anonymous personal identification information transmitted during the subsequent web browser session is associated with the electronic device 110 that stored the retrieved cookie from the initial web browser session. The computing system 115 may store the one or more items of anonymous personal identification information in the same user profile that contains the electronic device identification and the one or more items of anonymous personal identification information contained in the retrieved cookie from the initial web browser session based on mapping or associating the open-source software footprint attached to the one or more items of anonymous personal identification information obtained during the subsequent web browser session with the electronic device identification stored in the user profile in the server 120. Accordingly, the computing system 115 may store items of anonymous personal identification information in user profiles associated with specific electronic devices 110 without relying on the ability of the computing system to retrieve cookies stored in the memories of the electronic devices 110.

It should be understood that the computing system 115, utilizing the at least one processor 205, is configured to contemporaneously and continuously direct the transmission of data pieces to millions of electronic devices 110 located and mobile around the world and engaged in web browser sessions on millions of different web browsers. The computing system 115, utilizing the at least one processor 205, is also configured to contemporaneously and continuously receive or retrieve data pieces from the millions of electronic devices located and mobile around the world and engaged in web browser sessions on millions of different web browsers. The computing system 115, utilizing the at least one processor 205, is further configured to contemporaneously and continuously store the retrieved data pieces from the millions of electronic device located and mobile around the world and engaged in web browser sessions on millions of different web browsers in select user profiles stored in a plurality of servers 120. In addition, the computing system, utilizing the at least one processor 205, is configured to contemporaneously and continuously match electronic device identifications and items of anonymous personal identification information provided in each of the millions of data pieces with electronic device identifications and items of anonymous personal identification information in the millions of user profiles stored in the plurality of servers 120 to select the appropriate user profile(s) for storing electronic device identifications and items of anonymous personal identification information provided in each of the millions of data pieces and cookies. Thus, the computing system 115, utilizing the at least one processor 205, gathers electronic device identification and items of anonymous personal identification information continuously and contemporaneously in real time to provide and store the most up-to-date information and accordingly cannot be performed by human interaction.

Figure 4:
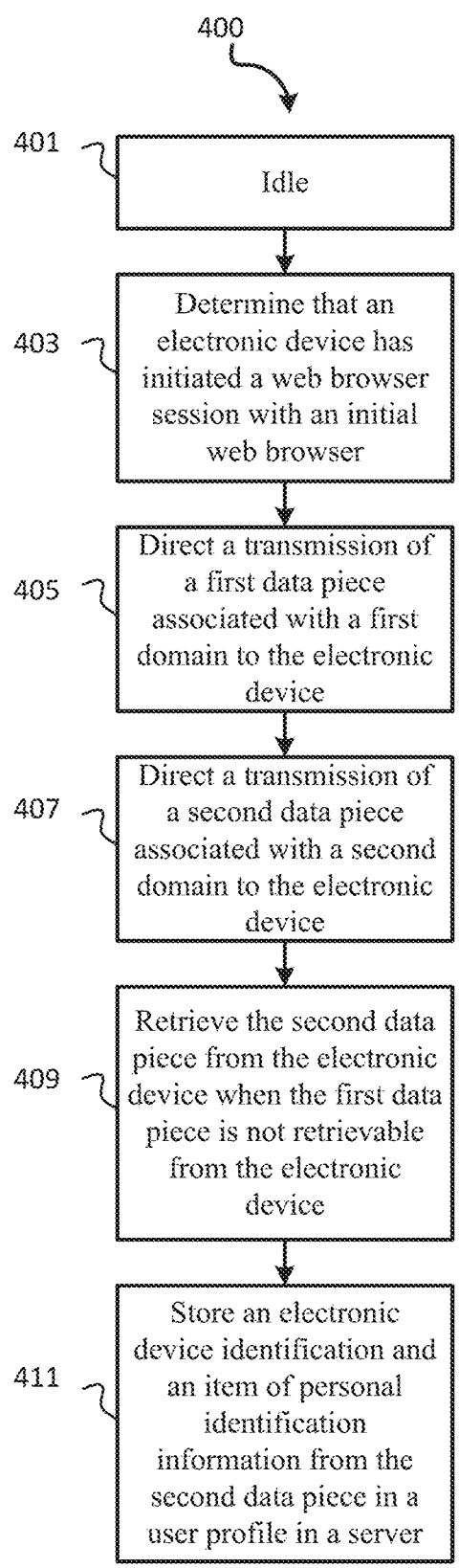
FIGS. 4-10 illustrate flow diagrams of methods for performing network interruption remedy operations according to certain embodiments of the disclosure.

FIG. 4 illustrates a method 400 implemented by the computing system 115, utilizing the at least one processor 205, for performing network interruption remedy operations according to certain embodiments of this disclosure. Although certain details will be provided with reference to the method 400 of FIG. 4, it should be understood that other embodiments may include more, less, or different method steps. At step 401, the computing system 115 is in an idle state at least with respect to performing network interruption remedy operations. At step 403, the computing system 115 determines that an electronic device 110 has initiated an engagement in a web browser session with the web browser 125 (e.g., an initial web browser) or that an electronic device 110 has requested content from the web browser 125.

At step 405, the computing system 115 directs a transmission of a first data piece associated with a first domain to the electronic device 110. In certain embodiments, the computing system 115 directs a transmission of the first data piece to the electronic device 110, when the electronic device 110 is engaged in an initial web browser session on the web browser 125, for storage in an electronic device memory. The first data piece may be associated with a first domain that is linked to the web browser 125 (e.g., the web browser domain). The first data piece may also contain an electronic device identification. The electronic device identification may be a unique identification that identifies a specific electronic device among all electronic devices. For example, the electronic device identification may be an identification that is unique to the electronic device 110. In certain embodiments, the electronic device identification includes at least one of a MAC address, an IMEI number, an electronic device serial number, a pointer associated with a data port of the electronic device, a combination thereof, or the like.

At step 407, the computing system 115 directs a transmission of a second data piece associated with a second domain to the electronic device 110. In certain embodiments, the computing system 115 directs a transmission of a second data piece to the electronic device 110, when the electronic device 110 is engaged in the initial web browser session on the web browser 125, for storage in the electronic device memory. The second data piece may be associated with a second domain that is linked to the web browser 125 (e.g., the web browser domain). The second data piece may also contain an electronic device identification. The electronic device identification contained in the second data piece may be a same electronic device identification as the electronic device identification contained in the first data piece.

At step 409, the computing system 115 retrieves the second data piece from the electronic device 110 when the first data piece is not retrievable from the electronic device 110. In certain embodiments, the computing system 115 retrieves the second data piece from the electronic device memory when the computing system 115 is not able to retrieve the first data piece from the electronic device memory. The electronic device 110 may store and execute data piece blocking software (e.g., anti-identification software, pop-up blocker software, advertisement (ad) blocker software). For example, the data piece blocking software may flag or block specific strings of HTML code contained in certain data pieces or may flag or block data pieces associated with entire domains. The data piece blocking software may have flagged or blocked the first data piece due to a specific string of HTML code contained in the first data piece. Additionally, or alternatively, the data piece blocking software may have blocked access to all data pieces from the first domain including the first data piece residing in the electronic device memory. In certain embodiments, the data piece blocking software may not have flagged or blocked the second data piece due to a lack of a specific string of HTML code contained in the second data piece that would cause the data piece blocking software to block the second data piece. Additionally, or alternatively, the data piece blocking software may not have blocked access to data pieces from the second domain including the second data piece residing in the electronic device memory.

The data piece blocking software stored and executed on the electronic device 110 may have prevented the computing system 115 from retrieving the first data piece from the memory of the electronic device 110. For example, the data piece blocking software may have blocked data pieces from being stored on a memory of electronic device 110 when the electronic device 110 is engaged in a web browser session on a web browser. Additionally, or alternatively, the data piece blocking software may have flagged data pieces that are stored in the memory of the electronic device 110 to prevent access to those flagged data pieces stored in the memory of the electronic device 110 when or after the electronic device 110 is engaged in the web browser session on the web browser.

In certain embodiments, the second data piece retrieved from the electronic device 110 contains the electronic device identification and one or more items of anonymous personal identification information provided by the electronic device 110 during the web browser session. For example, when the electronic device 110 initiates the web browser session with the web browser 125, the computing system 115 may direct the web browser 125 to transmit a data piece to the memory of electronic device 110. Similarly, the computing system 115 my direct a first domain to transmit the first data piece associated with the first domain and a second domain to transmit the second data piece associated with the second domain. Before the data piece from the web browser 125, the first data piece, and the second data piece are stored in the memory of the electronic device 110, each of the data piece from the web browser 125, the first data piece, and the second data piece include the electronic device identification. After the data piece from the web browser 125, the first data piece, and the second data piece are stored in the memory of the electronic device 110, the electronic device 110 may transmit one or more items of anonymous personal identification information to the web browser 125 during the web browser session. In certain embodiments, the one or more items of anonymous personal identification information may include an email address, a postal address, a user identification (ID), a gender, an age group, a user interest, a combination thereof, or the like. In certain embodiments, the one or more items of anonymous personal identification information includes a hash value.

The transmitted one or more items of anonymous personal identification information may also be stored in the data piece from the web browser 125 residing in the memory of the electronic device 110. The one or more items of anonymous personal identification information may be stored in the data piece from the web browser 125 residing in the memory of the electronic device 110 so that the electronic device 110 or the web browser 125 may quickly and easily access the anonymous personal identification information during a subsequent web browser session between the electronic device 110 and the web browser 125. In addition, because the first data piece and the second data piece are linked to the web browser 125 via the first domain and the second domain, respectively, the anonymous personal identification information may also be stored in the first data piece and the second data piece residing in the memory of electronic device 110. Thus, when the computing system 115 retrieves the second data piece from the memory of the electronic device 110, the second data piece includes the electronic device identification and the one or more items of anonymous personal identification information provided by the electronic device 110 during the web browser session.

At step 411, the computing system 115 stores the electronic device identification and the one or more items of anonymous personal identification information from the second data piece in a user profile of a server 120. In certain embodiments, the computing system 115 stores the electronic device identification and the one or more items of anonymous personal identification information from the second data piece in a user profile previously created and stored on the server 120. For example, the computing system 115 may have previously generated a user profile containing at least one of an electronic device identification or one or more items of anonymous personal identification information provided in a previously obtained data piece. When the computing system 115 receives the second data piece containing the electronic device identification and the one or more items of anonymous personal identification information, the computing system 115 may match at least one of the electronic device identification or at least one of the one or more items of anonymous personal identification information from the second data piece with at least one of the electronic device identification or at least one of the one or more items of anonymous personal identification information stored in the user profile. When the computing system 115 identifies a match, the computing system 115 may store the electronic device identification and the one or more items anonymous personal identification information from the second data piece in the user profile in the server 120.

In certain embodiments, the computing system 115 stores electronic device identification and the one or more items of anonymous personal identity information from the second data piece in a newly created user profile stored in the server 120. For example, the computing system 115 may search through the server 120 to identify (e.g., find, locate) a user profile containing at least one of electronic device identification or one of one or more items of anonymous personal identification information that matches at least one of the electronic device identification or one of the one or more items of anonymous personal identification information contained in the second data piece. After searching through the server 120, the computing system 115 may determine that no match exists between at least one of the electronic device identification or one of the one or more items of anonymous personal identification information contained in the second data piece and at least one of electronic device identification or one of one or more items of anonymous personal identification information contained in a user profile of the server 120. In response, the computing system 115 may create a new user profile in the server 120 and store the electronic device identification and the one or more items of anonymous personal identification information from the second data piece in the newly created user profile.

Figure 5:
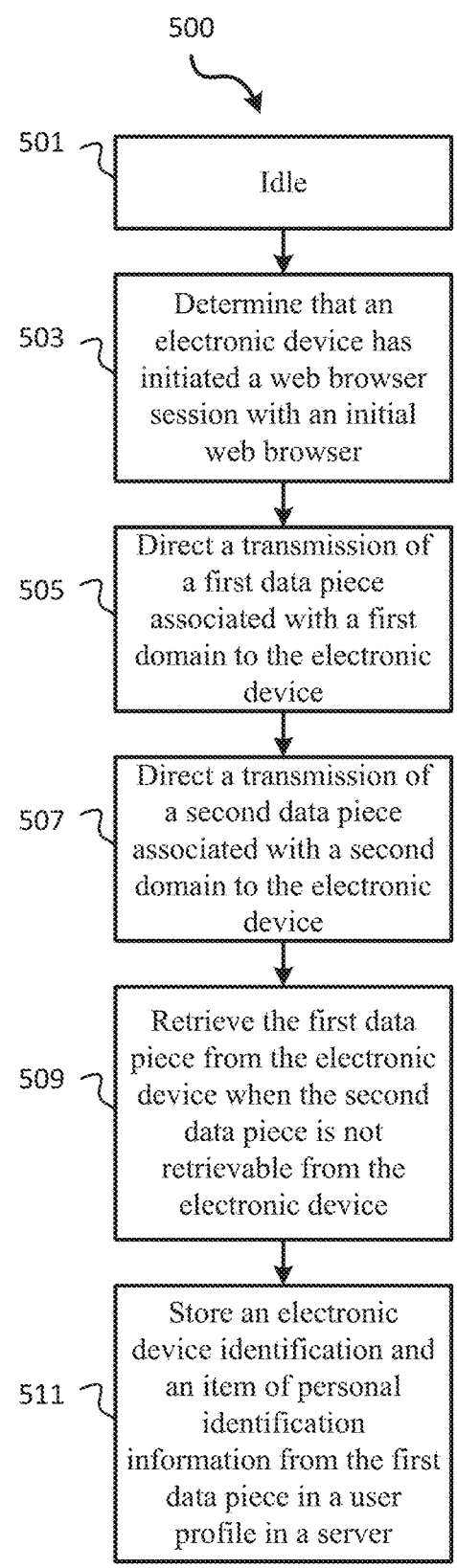

FIG. 5 illustrates a method 500 implemented by a computing system 115 for performing network interruption remedy operations according to certain embodiments of this disclosure. Although certain details will be provided with reference to the method 500 of FIG. 5, it should be understood that other embodiments may include more, less, or different method steps. At step 501, the computing system 115 is in an idle state at least with respect to performing network interruption remedy operations. Step 501 is at least similar to step 401 of method 400 illustrated in FIG. 4. At step 503, the computing system 115 determines that an electronic device 110 has initiated an engagement in a web browser session with a web browser 125 (e.g., an initial web browser) or that an electronic device 110 has requested content from the web browser 125. Step 503 is at least similar to step 403 of method 400 illustrated in FIG. 4. At step 505, the computing system 115 directs a transmission of a first data piece associated with a first domain to the electronic device 110. Step 505 is at least similar to step 405 of method 400 illustrated in FIG. 4. At step 507, the computing system 115 directs a transmission of a second data piece associated with a second domain to the electronic device 110. Step 507 is at least similar to step 407 of method 400 illustrated in FIG. 4.

At step 509, the computing system 115 retrieves the first data piece from the electronic device 110 when the second data piece is not retrievable from the electronic device 110. In certain embodiments, the computing system 115 retrieves the first data piece from the electronic device 110 memory when the computing system 115 is not able to retrieve the second data piece from the electronic device memory. The electronic device 110 may store and execute data piece blocking software (e.g., anti-identification software, pop-up blocker software, advertisement (ad) blocker software). For example, the data piece blocking software may flag or block specific strings of HTML code contained in certain data pieces or may flag or block data pieces associated with entire domains. The data piece blocking software may have flagged or blocked the second data piece due to a specific string of HTML code contained in the second data piece. Additionally, or alternatively, the data piece blocking software may have blocked access to all data pieces from the second domain including the second data piece residing in the electronic device memory.

The data piece blocking software stored and executed on the electronic device 110 may have prevented the computing system 115 from retrieving the second data piece from the memory of the electronic device 110. For example, the data piece blocking software may have blocked data pieces from being stored on a memory of electronic device 110 when the electronic device 110 is engaged in a web browser session on a web browser. Additionally. or alternatively, the data piece blocking software may have flagged data pieces that are stored in the memory of the electronic device 110 to prevent access to those flagged data pieces stored in the memory of the electronic device 110 when or after the electronic device 110 is engaged in the web browser session on the web browser. In certain embodiments, the data piece blocking software may not have flagged or blocked the first data piece due to a lack of a specific string of HTML code contained in the first data piece that would cause the data piece blocking software to block the first data piece. Additionally, or alternatively, the data piece blocking software may not have blocked access to data pieces from the first domain including the first data piece residing in the electronic device memory.

In certain embodiments, the first data piece retrieved from the electronic device 110 contains the electronic device identification and one or more items of anonymous personal identification information provided by the electronic device 110 during the web browser session. For example, when the electronic device 110 initiates the web browser session with the web browser 125, the computing system 115 may direct the web browser 125 to transmit a data piece to the memory of electronic device 110. Similarly, the computing system 115 directs the transmission of the first data piece associated with the first domain and the transmission of the second data piece associated with the second domain. Before the data piece from the web browser 125, the first data piece, and the second data piece are stored in the memory of the electronic device 110, each of the data piece from the web browser 125, the first data piece, and the second data piece include the electronic device identification. After the data piece from the web browser 125, the first data piece, and the second data piece are stored in the memory of the electronic device 110, the electronic device 110 may transmit one or more items of anonymous personal identification information to the web browser 125 during the web browser session. In certain embodiments, the one or more items of anonymous personal identification information may include an email address, a postal address, a user identification (ID), a gender, an age group, a user interest, a combination thereof, or the like. In certain embodiments, the one or more items of anonymous personal identification information includes a hash value.

The transmitted one or more items of anonymous personal identification information may also be stored in the data piece from the web browser 125 residing in the memory of the electronic device 110. The one or more items of anonymous personal identification information may be stored in the data piece from the web browser 125 residing in the memory of the electronic device 110 so that the electronic device 110 or the web browser 125 may quickly and easily access the anonymous personal identification information during a subsequent web browser session between the electronic device 110 and the web browser 125. In addition, because the first data piece and the second data piece are linked to the web browser 125 via the first domain and the second domain, respectively, the anonymous personal identification information may also be stored in the first data piece and the second data piece residing in the memory of electronic device 110. Thus, when the computing system 115 retrieves the first data piece from the memory of electronic device 110, the first data piece includes the electronic device identification and the one or more items of anonymous personal identification information provided by the electronic device 110 during the web browser session.

At step 511, the computing system 115 stores the electronic device identification and the one or more items of anonymous personal identification information from the first data piece in a user profile of a server 120. In certain embodiments, the computing system 115 stores the electronic device identification and the one or more items of anonymous personal identification information from the first data piece in a user profile previously created and stored on the server 120. For example, the computing system 115 may have previously generated a user profile containing at least one of an electronic device identification or one or more items of anonymous personal identification information provided in a previously obtained data piece. When the computing system 115 receives the first data piece containing the electronic device identification and the one or more items of anonymous personal identification information, the computing system 115 may match at least one of the electronic device identification or at least one of the one or more items of anonymous personal identification information from the first data piece with at least one of the electronic device identification or at least one of the one or more items of anonymous personal identification information stored in the user profile. When the computing system 115 identifies a match, the computing system 115 may store the electronic device identification and the one or more items anonymous personal identification information from the first data piece in the user profile in the server 120.

In certain embodiments, the computing system 115 stores electronic device identification and the one or more items of anonymous personal identity information from the first data piece in a newly created user profile stored in the server 120. For example, the computing system 115 may search through the server 120 to identify (e.g., find, locate) a user profile containing at least one of electronic device identification or one of one or more items of anonymous personal identification information that matches at least one of the electronic device identification or one of the one or more items of anonymous personal identification information contained in the first data piece. After searching through the server 120, the computing system 115 may determine that no match exists between at least one of the electronic device identification or one of the one or more items of anonymous personal identification information contained in the first data piece and at least one of electronic device identification or one of one or more items of anonymous personal identification information contained in a user profile of the server 120. In response, the computing system 115 may create a new user profile in the server 120 and store the electronic device identification and the one or more items of anonymous personal identification information from the first data piece in the newly created user profile.

Figure 6:
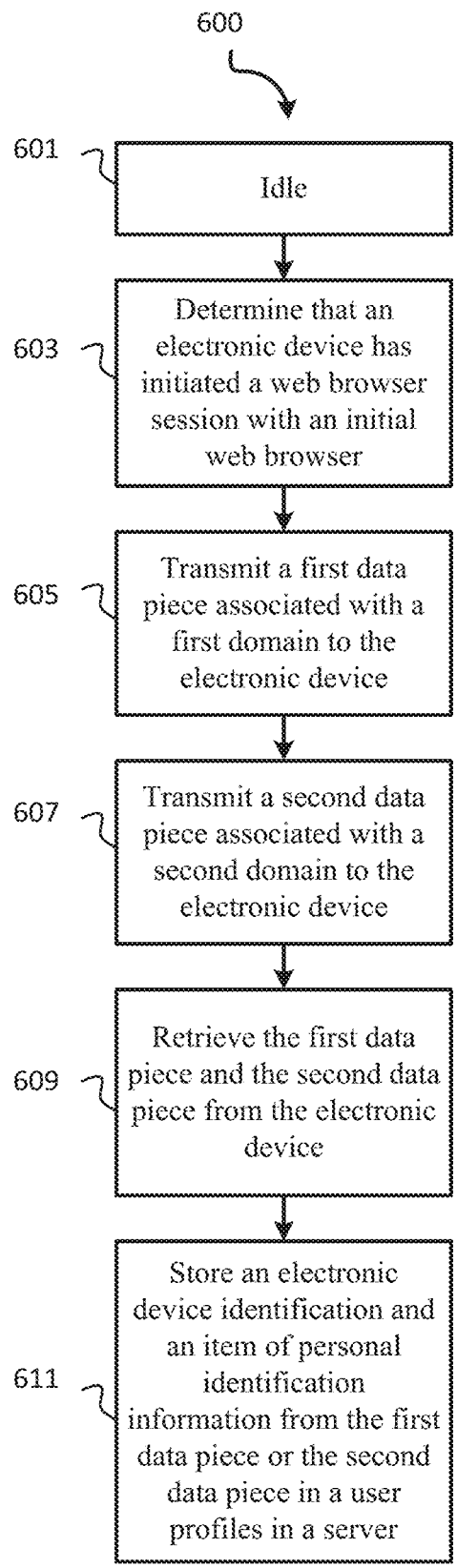

FIG. 6 illustrates a method 600 implemented by a computing system 115 for performing network interruption remedy operations according to certain embodiments of this disclosure. Although certain details will be provided with reference to the method 600 of FIG. 6, it should be understood that other embodiments may include more, less, or different method steps. At step 601, the computing system 115 is in an idle state at least with respect to performing network interruption remedy operations. Step 601 is at least similar to step 401 of method 400 illustrated in FIG. 4. At step 603, the computing system 115 determines that an electronic device 110 has initiated an engagement in a web browser session with a web browser 125 (e.g., an initial web browser) or that an electronic device 110 has requested content from the web browser 125. Step 603 is at least similar to step 403 of method 400 illustrated in FIG. 4. At step 605, the computing system 115 directs a transmission of a first data piece associated with a first domain to the electronic device 110. Step 605 is at least similar to step 405 of method 400 illustrated in FIG. 4. At step 607, the computing system 115 directs a transmission of a second data piece associated with a second domain to the electronic device 110. Step 607 is at least similar to step 407 of method 400 illustrated in FIG. 4.

At step 609, the computing system 115 retrieves the first data piece and the second data piece from the electronic device 110. In certain embodiments, the computing system 115 retrieves the first data piece and the second data piece from the electronic device memory when the first data piece and the second data piece are retrievable from the electronic device 110. The electronic device 110 may store and execute data piece blocking software (e.g., anti-identification software, pop-up blocker software, advertisement (ad) blocker software). For example, the data piece blocking software may flag or block specific strings of HTML code contained in certain data pieces or may flag or block data pieces associated with entire domains. The data piece blocking software may not have flagged or blocked the first data piece and the second data piece due to a lack of a specific string of HTML code contained in the first data piece or the second data piece that would cause the data piece blocking software to block the first data piece and the second data piece. Additionally, or alternatively, the data piece blocking software may not have blocked access to data pieces from the first domain and the second domain including the first data piece and the second data piece residing in the electronic device memory.

The data piece blocking software stored and executed on the electronic device 110 may not have prevented the computing system 115 from retrieving the first data piece and the second data piece from the memory of the electronic device 110. For example, the data piece blocking software may not have blocked some data pieces from being stored on a memory of electronic device 110 when the electronic device 110 is engaged in a web browser session on a web browser. Additionally, or alternatively, the data piece blocking software may not have flagged some data pieces that are stored in the memory of the electronic device 110 to permit access to those flagged data pieces stored in the memory of the electronic device 110 when or after the electronic device 110 is engaged in the web browser session on the web browser.

In certain embodiments, the first data piece and the second data piece retrieved from the electronic device 110 contains the electronic device identification and one or more items of anonymous personal identification information provided by the electronic device 110 during the web browser session. For example, when the electronic device 110 initiates the web browser session with the web browser 125, the computing system 115 may direct the web browser 125 to transmit a data piece to the memory of electronic device 110. Similarly, the computing system 115 directs the transmission of the first data piece associated with the first domain and the second data piece associated with the second domain. Before the data piece from the web browser 125, the first data piece, and the second data piece are stored in the memory of the electronic device 110, each of the data piece from the web browser 125, the first data piece, and the second data piece include the electronic device identification. After the data piece from the web browser 125, the first data piece, and the second data piece are stored in the memory of the electronic device 110, the electronic device 110 may transmit one or more items of anonymous personal identification information to the web browser 125 during the web browser session. In certain embodiments, the one or more items of anonymous personal identification information may include an email address, a postal address, a user identification (ID), a gender, an age group, a user interest, a combination thereof, or the like. In certain embodiments, the one or more items of anonymous personal identification information includes a hash value.

The transmitted one or more items of anonymous personal identification information may also be stored in the data piece from the web browser 125 residing in the memory of the electronic device 110. The one or more items of anonymous personal identification information may be stored in the data piece from the web browser 125 residing in the memory of the electronic device 110 so that the electronic device 110 or the web browser 125 may quickly and easily access the anonymous personal identification information during a subsequent web browser session between the electronic device 110 and the web browser 125. In addition, because the first data piece and the second data piece are linked to the web browser 125 via the first domain and the second domain, respectively, the anonymous personal identification information may also be stored in the first data piece and the second data piece residing in the memory of electronic device 110. Thus, when the computing system 115 retrieves the first data piece and the second data piece from the memory of electronic device 110, the first data piece and the second data piece each includes the electronic device identification and the one or more items of anonymous personal identification information provided by the electronic device 110 during the web browser session.

At step 611, the computing system 115 stores the electronic device identification and the one or more items of anonymous personal identification information from the first data piece or the second data piece in a user profile of a server 120. In certain embodiments, the computing system 115 stores the electronic device identification and the one or more items of anonymous personal identification information from the first data piece or the second data piece in a user profile previously created and stored on the server 120. For example, the computing system 115 may have previously generated a user profile containing at least one of an electronic device identification or one or more items of anonymous personal identification information provided in a previously obtained data piece. When the computing system 115 receives the first data piece and the second data piece each containing the electronic device identification and the one or more items of anonymous personal identification information, the computing system 115 may match at least one of the electronic device identification or at least one of the one or more items of anonymous personal identification information from the first data piece and the second data piece with at least one of the electronic device identification or at least one of the one or more items of anonymous personal identification information stored in the user profile. When the computing system 115 identifies a match, the computing system 115 may store the electronic device identification and the one or more items anonymous personal identification information from the first data piece or the second data piece in the user profile in the server 120.

In certain embodiments, the computing system 115 stores electronic device identification and the one or more items of anonymous personal identity information from the first data piece or the second data piece in a newly created user profile stored in the server 120. For example, the computing system 115 may search through the server 120 to identify a user profile containing at least one of electronic device identification or one of one or more items of anonymous personal identification information that matches at least one of the electronic device identification or one of the one or more items of anonymous personal identification information contained in the first data piece and the second data piece. After searching through the server 120, the computing system 115 may determine that no match exists between at least one of the electronic device identification or one of the one or more items of anonymous personal identification information contained in the first data piece and contained in the second data piece and at least one of electronic device identification or one of one or more items of anonymous personal identification information contained in a user profile of the server 120. In response, the computing system 115 may create a new user profile in the server 120 and store the electronic device identification and the one or more items of anonymous personal identification information from the first data piece or the second data piece in the newly created user profile.

In certain embodiments, the computing system 115 determines that the electronic device identification and the one or more items of anonymous personal identification information from the first data piece matches the electronic device identification and the one or more items of anonymous personal identification information from the second data piece. In response, the computing system 115 may delete one of the first data piece or the second data piece and store the electronic device identification and the one or more items of anonymous personal identification information from the remaining (e.g., not deleted) data piece in the user profile in the server 120. Alternatively, in response, the computing system 115 may store the electronic device identification and the one or more items of anonymous personal identification information from both the first data piece and the second data piece in the user profile in the server 120.

Figure 7:
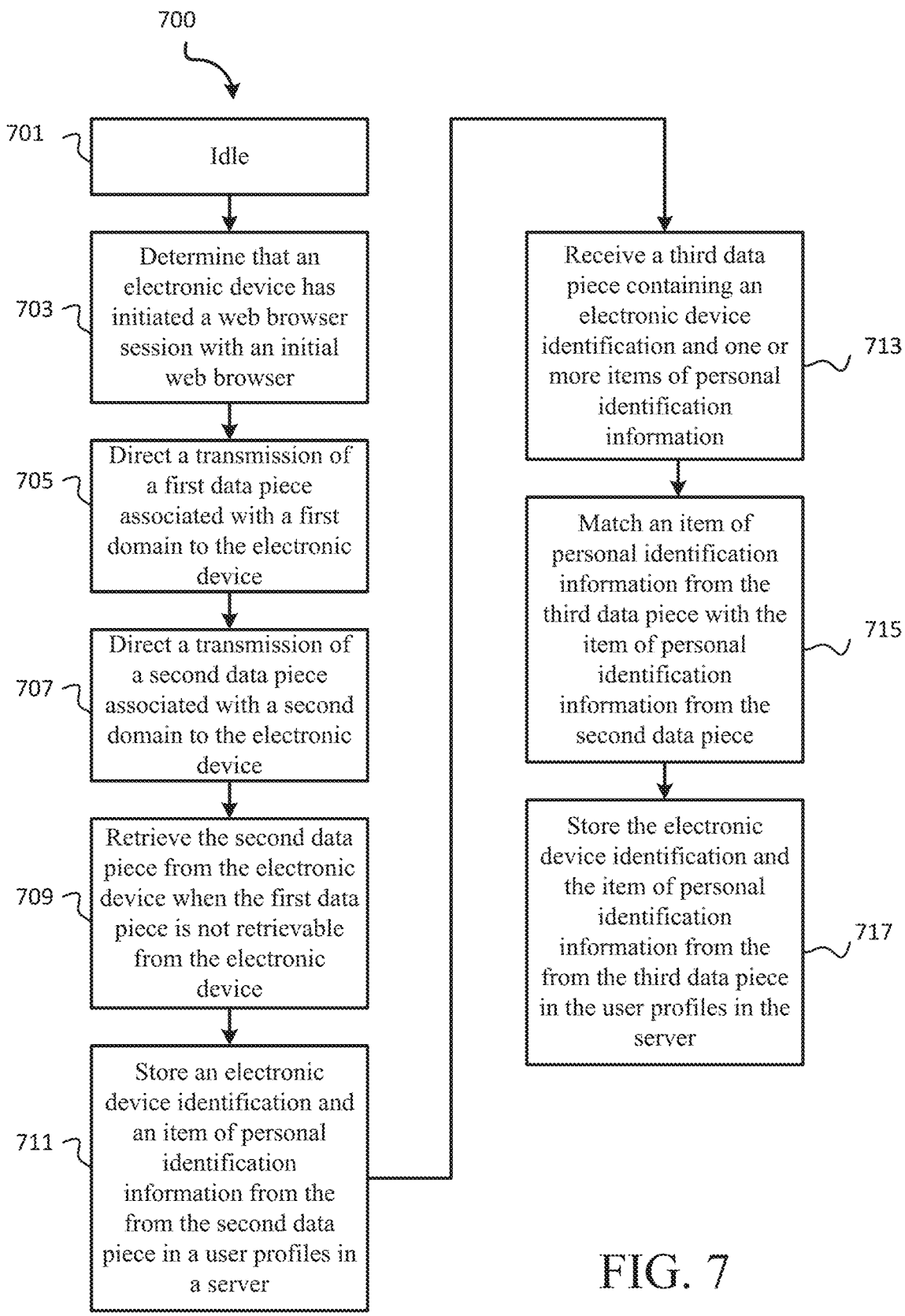

FIG. 7 illustrates a method 700 implemented by a computing system 115 for performing network interruption remedy operations according to certain embodiments of this disclosure. Although certain details will be provided with reference to the method 700 of FIG. 7, it should be understood that other embodiments may include more, less, or different method steps. At step 701, the computing system 115 is in an idle state at least with respect to performing network interruption remedy operations. Step 701 is at least similar to step 401 of method 400 illustrated in FIG. 4. At step 703, the computing system 115 determines that an electronic device 110 has initiated an engagement in a web browser session with a web browser 125 (e.g., an initial web browser) or that an electronic device 110 has requested content from the web browser 125. Step 703 is at least similar to step 403 of method 400 illustrated in FIG. 4. At step 705, the computing system 115 directs a transmission of a first data piece associated with a first domain to the electronic device 110. Step 705 is at least similar to step 405 of method 400 illustrated in FIG. 4. At step 707, the computing system 115 directs a transmission of a second data piece associated with a second domain to the electronic device 110. Step 707 is at least similar to step 407 of method 400 illustrated in FIG. 4. At step 709, the computing system 115 retrieves the second data piece from the electronic device 110 when the first data piece is not retrievable from the electronic device 110. Step 709 is at least similar to step 409 of method 400 illustrated in FIG. 4. At step 711, the computing system 115 stores the electronic device identification and the one or more items of anonymous personal identification information from the second data piece in a user profile of a server 120. Step 711 is at least similar to step 411 of method 400 illustrated in FIG. 4.

At step 713, the computing system 115 receives a third data piece containing at least one of an electronic device identification or one or more items of anonymous personal identification information. In certain embodiments, the computing system 115 may have received the third data piece in same or similar manner as described herein with respect to the first data piece or the second data piece. Alternatively, the computing system 115 may have received the third data piece through a data transfers from one or more other servers. In response to receiving the third data piece, the computing system 115 may search through the server 120 to identify one or more user profiles containing electronic device identification and one or more items of anonymous personal identification information that match at least the electronic device identification or one of the one or more items anonymous personal identification information contained in the third data piece.

At step 715, the computing system 115 determines that at least one of the electronic device identification or one of the one or more items of anonymous personal identification information contained in the third data piece matches at least one of the electronic device identification or one of the one or more items of anonymous personal identification information stored in a user profile in the server 120. For example, the computing system 115 may search through the server 120 and identify at least one user profile in the server 120 that contains an electronic device identification that matches the electronic device identification contained in the third data piece. As another example, the computing system 115 may search the server and identify at least one user profile in the server that contains a phone number that matches a phone number contained in the third data piece.

At step 717, the computing system 115 stores the electronic device identification and the one or more items of anonymous personal identification information in a user profile in the server 120. For example, the third data piece may contain an electronic device identification that matches the electronic device identification stored in the user profile. In response, the computing system 115 may store the electronic device identification and the one or more items of anonymous personal identification information from the third data piece in the user profile based on a match between the electronic device identification contained in the third data piece and the electronic device identification stored in the user profile. As another example, the third data piece may contain an email address that matches an email address stored in the user profile. In response, the computing system 115 may store the electronic device identification and the one or more items of anonymous personal identification information from the third data piece in the user profile based on a match between the email address contained in the third data piece and an email address stored in the user profile. In certain embodiments, the computing system 115 may store the electronic device identification and the one or more items of anonymous personal identification information from the third data piece in a user profile that includes the electronic device identification and the one or more items of anonymous personal identification information from the first data piece or the second data piece. Additionally, or alternatively, the computing system 115 may store the electronic device identification and the one or more items of anonymous personal identification information from the third data piece in a user profile that does not include the electronic device identification and the one or more items of anonymous personal identification information from the first data piece and the second data piece.

In certain embodiments, the computing system 115 stores the electronic device identification and the one or more items of anonymous personal identity information from the third data piece in a newly created user profile stored in the server 120. For example, the computing system 115 may search through the server 120 to identify a user profile containing at least one of electronic device identification or one of one or more items of anonymous personal identification information that matches at least one of the electronic device identification or one of the one or more items of anonymous personal identification information contained in the third data piece. After searching through the server 120, the computing system 115 may determine that no match exists between at least one of the electronic device identification or one of the one or more items of anonymous personal identification information contained in the third data piece and at least one of electronic device identification or one of one or more items of anonymous personal identification information stored in any user profile in the server 120. In response, the computing system 115 may create a new user profile in the server 120 and store the electronic device identification and the one or more items of anonymous personal identification information from the third data piece in the newly created user profile.

Figure 8:
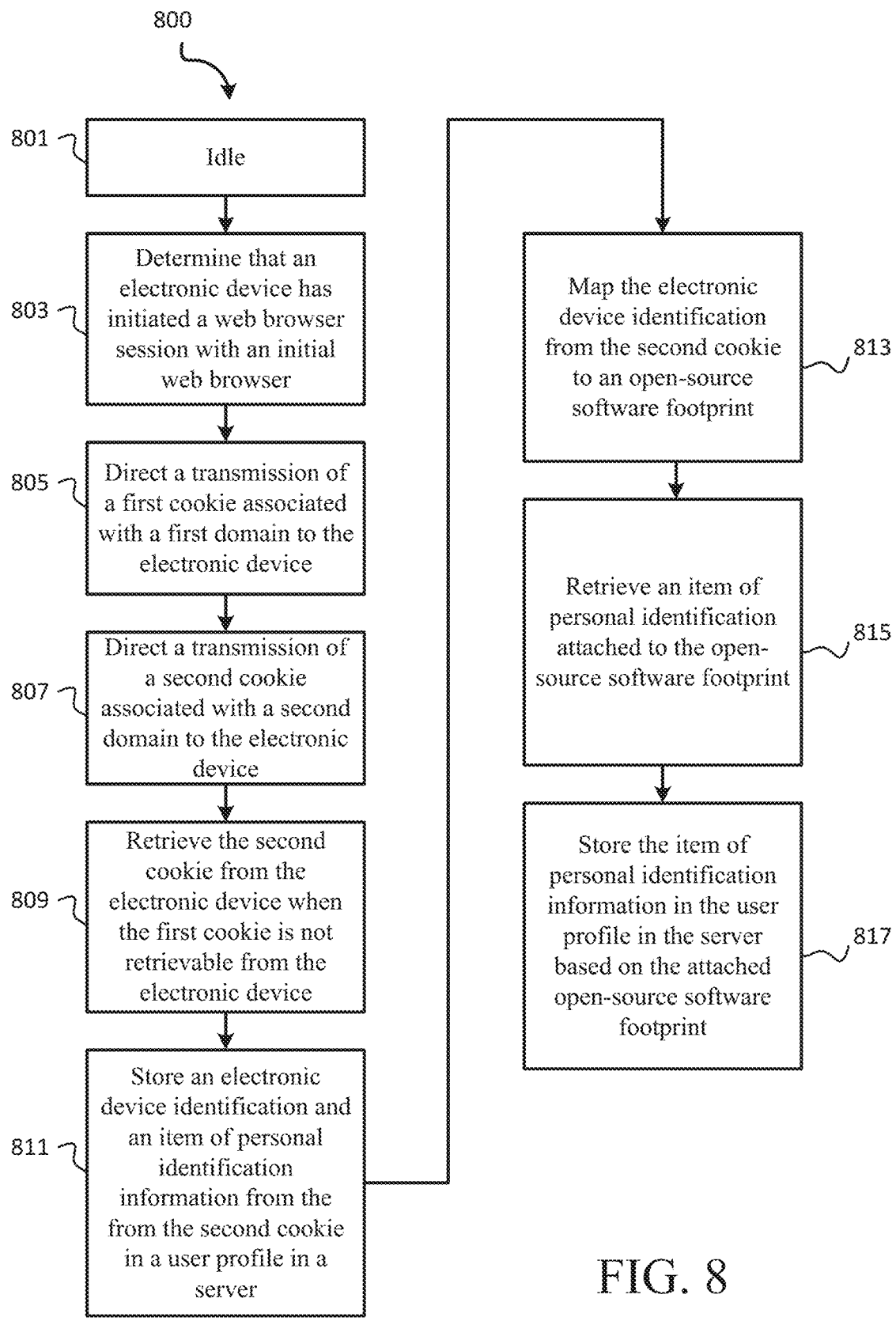

FIG. 8 illustrates a method 800 implemented by the computing system 115 for performing network interruption remedy operations according to certain embodiments of this disclosure. Although certain details will be provided with reference to the method 800 of FIG. 8, it should be understood that other embodiments may include more, less, or different method steps. In certain embodiments, a data pieces may include a cookie. A cookie (e.g., an HTTP cookie, a web cookie, an Internet cookie, a browser cookie) is a piece of data sent from a website and stored on a memory of an electronic device 110 by a web browser of the electronic device 110 while the electronic device is engaged in a browser session. At step 801, the computing system 115 is in an idle state at least with respect to performing network interruption remedy operations. Step 801 is at least similar to step 401 of method 400 illustrated in FIG. 4. At step 803, the computing system 115 determines that an electronic device 110 has initiated an engagement in a web browser session with the web browser 125 (e.g., an initial web browser) or that an electronic device 110 has requested content from the web browser 125.

At step 805, the computing system 115 directs the transmission of a first cookie associated with a first domain to the electronic device 110. In certain embodiments, the computing system 115 directs the transmission of the first cookie to the electronic device 110, when the electronic device 110 is engaged in an initial web browser session on the web browser 125, for storage in an electronic device memory. The first cookie may be associated with a first domain that is linked to the web browser 125 (e.g., the web browser domain). The first cookie may also contain an electronic device identification. The electronic device identification may be a unique identification that identifies a specific electronic device among all electronic devices. For example, the electronic device identification may be an identification that is unique to the electronic device 110. In certain embodiments, the electronic device identification includes at least one of a MAC address, an IMEI number, an electronic device serial number, a pointer associated with a data port of the electronic device, a combination thereof, or the like.

At step 807, the computing system 115 directs the transmission of a second cookie associated with a second domain to the electronic device 110. In certain embodiments, the computing system 115 directs the transmission of a second cookie to the electronic device 110, when the electronic device 110 is engaged in the initial web browser session on the web browser 125, for storage in the electronic device memory. The second cookie may be associated with a second domain that is linked to the web browser 125 (e.g., the web browser domain). The second cookie may also contain an electronic device identification. The electronic device identification contained in the second cookie may be a same electronic device identification as the electronic device identification contained in the first cookie.

At step 809, the computing system 115 retrieves the second cookie from the electronic device 110 when the first cookie is not retrievable from the electronic device 110. In certain embodiments, the computing system 115 retrieves the second cookie from the electronic device memory when the computing system 115 is not able to retrieve the first cookie from the electronic device memory. The electronic device 110 may store and execute cookie blocking software (e.g., anti-identification software, pop-up blocker software, advertisement (ad) blocker software). For example, the cookie blocking software may flag or block specific strings of HTML code contained in certain cookies or may flag or block cookies associated with entire domains. The cookie blocking software may have flagged or blocked the first cookie due to a specific string of HTML code contained in the first cookie. Additionally, or alternatively, the cookie blocking software may have blocked access to all cookies from the first domain including the first cookie residing in the electronic device memory. In certain embodiments, the cookie blocking software may not have flagged or blocked the second cookie due to a lack of a specific string of HTML code contained in the second cookie that would cause the cookie blocking software to block the second cookie. Additionally, or alternatively, the cookie blocking software may not have blocked access to cookies from the second domain including the second cookie residing in the electronic device memory.

The data piece blocking software stored and executed on the electronic device 110 may have prevented the computing system 115 from retrieving the first data piece from the memory of the electronic device 110. For example, the data piece blocking software may have blocked data pieces from being stored on a memory of electronic device 110 when the electronic device 110 is engaged in a web browser session on a web browser. Additionally, or alternatively, the data piece blocking software may have flagged data pieces that are stored in the memory of the electronic device 110 to prevent access to those flagged data pieces stored in the memory of the electronic device 110 when or after the electronic device 110 is engaged in the web browser session on the web browser.

In certain embodiments, the second cookie retrieved from the electronic device 110 contains the electronic device identification and one or more items of anonymous personal identification information provided by the electronic device 110 during the web browser session. For example, when the electronic device 110 initiates the web browser session with the web browser 125, the web browser 125 transmits a cookie to the memory of electronic device 110. Similarly, the computing system 115 transmits the first cookie associated with the first domain and the second cookie associated with the second domain. Before the cookie from the web browser 125, the first cookie, and the second cookie are stored in the memory of the electronic device 110, each of the cookie from the web browser 125, the first cookie, and the second cookie include the electronic device identification. After the cookie from the web browser 125, the first cookie, and the second cookie are stored in the memory of the electronic device 110, the electronic device 110 may transmit one or more items of anonymous personal identification information to the web browser 125 during the web browser session. In certain embodiments, the one or more items of anonymous personal identification information may include an email address, a postal address, a user identification (ID), a gender, an age group, a user interest, a combination thereof, or the like. In certain embodiments, the one or more items of anonymous personal identification information includes a hash value.

The transmitted one or more items of anonymous personal identification information may also be stored in the cookie from the web browser 125 residing in the memory of the electronic device 110. The one or more items of anonymous personal identification information may be stored in the cookie from the web browser 125 residing in the memory of the electronic device 110 so that the electronic device 110 or the web browser 125 may quickly and easily access the anonymous personal identification information during a subsequent web browser session between the electronic device 110 and the web browser 125. In addition, because the first cookie and the second cookie are linked to the web browser 125 via the first domain and the second domain, respectively, the anonymous personal identification information may also be stored in the first cookie and the second cookie residing in the memory of electronic device 110. Thus, when the computing system 115 retrieves the second cookie from the memory of the electronic device 110, the second cookie includes the electronic device identification and the one or more items of anonymous personal identification information provided by the electronic device 110 during the web browser session.

At step 811, the computing system 115 stores the electronic device identification and the one or more items of anonymous personal identification information from the second cookie in a user profile of a server 120. In certain embodiments, the computing system 115 stores the electronic device identification and the one or more items of anonymous personal identification information from the second cookie in a user profile previously created and stored on the server 120. For example, the computing system 115 may have previously generated a user profile containing at least one of an electronic device identification or one or more items of anonymous personal identification information provided in a previously obtained cookie. When the computing system 115 receives the second cookie containing the electronic device identification and the one or more items of anonymous personal identification information, the computing system 115 may match at least one of the electronic device identification or at least one of the one or more items of anonymous personal identification information from the second cookie with at least one of the electronic device identification or at least one of the one or more items of anonymous personal identification information stored in the user profile. When the computing system 115 identifies a match, the computing system 115 may store the electronic device identification and the one or more items anonymous personal identification information from the second cookie in the user profile in the server 120.

In certain embodiments, the computing system 115 stores electronic device identification and the one or more items of anonymous personal identity information from the second cookie in a newly created user profile stored in the server 120. For example, the computing system 115 may search through the server 120 to identify (e.g., find, locate) a user profile containing at least one of electronic device identification or one of one or more items of anonymous personal identification information that matches at least one of the electronic device identification or one of the one or more items of anonymous personal identification information contained in the second cookie. After searching through the server 120, the computing system 115 may determine that no match exists between at least one of the electronic device identification or one of the one or more items of anonymous personal identification information contained in the second cookie and at least one of electronic device identification or one of one or more items of anonymous personal identification information contained in a user profile of the server 120. In response, the computing system 115 may create a new user profile in the server 120 and store the electronic device identification and the one or more items of anonymous personal identification information from the second cookie in the newly created user profile.

At step 813, the computing system 115 maps or associates the electronic device identification from the second cookie to an open-source software footprint. An open-source software footprint may be a unique set of traceable digital activities, actions, contributions, or communications that are manifested in open-source code on the internet or on electronic devices. The electronic device 110 may transmit one or more items of anonymous personal identification information to the web browser 125 during a browser session (e.g., an initial browser session). The one or more items of anonymous personal identification information transmitted from the electronic device 110 includes an open-source software footprint that is unique to the electronic device 110 or that provides the computing system 115 with an acceptable level of certainty that the specific electronic device 110 is transmitting the one or more items of anonymous personal identification information.

As discussed herein, when the electronic device 110 transmits the one or more items of anonymous personal identification information to the web browser 125, the one or more items of anonymous personal identification information may also be stored in the cookie of the web browser 125, the first cookie, and the second cookie each stored in the memory of the electronic device 110. While the transmitted one or more items of anonymous personal identification information may not include the electronic device identification, the cookie of the web browser 125, the first cookie, and the second cookie each includes the electronic device identification. In addition, the one or more items of anonymous personal identification information stored in each of the cookie of the web browser 125, the first cookie, and the second cookie may also include the open-source software footprint. Thus, when the computing system 115 retrieves the second cookie from the memory of the electronic device 110, the computing system 115 maps or associates the open-source software footprint from the second cookie to the electronic device identification from the second cookie. Accordingly, the computing system 115 maps or associates the open-source software footprint with the specific electronic device 110.

At step 815, the computing system 115 retrieves an item of personal identification information that is attached to the open-source software footprint. For example, after the computing system 115 has mapped or associated the open-source software footprint from the second cookie to the electronic device identification from the second cookie and the computing system 115 has stored the electronic device identification and the one or more items of anonymous personal identification information from the second cookie in the user profile in the server 120, the electronic device 110 may engage in a subsequent web browser session with a web browser 125 (e.g., the same web browser, another web browser). During the subsequent web browser session, the electronic device 110 may transmit one or more items of anonymous personal identification information to the web browser 125. The one or more items of anonymous personal notification information transmitted to the web browser 125 during the subsequent web browser session may be different items of anonymous personal identification information from the one or more items of anonymous personal identification information transmitted the web browser during the initial web browser session.

The one or more items of anonymous personal identification information transmitted from the electronic device 110 during the subsequent web browser session may include the open-source software footprint. The computing system 115 may intercept, receive, or retrieve the transmitted one or more items of anonymous personal identification information transmitted from the electronic device 110 during the subsequent web browser session and identify that the one or more items of anonymous personal identification information includes the open-source software footprint. The computing system 115 may then map or associate the one or more items of anonymous personal identification information transmitted by the electronic device 110 during the subsequent web browser session with the previously provided electronic device identification from the second cookie based on the open-source software footprint. Based on mapping the electronic device identification with the open-source software footprint during the initial web browser session, the computing system 115 may identify that the electronic device 110 is the source of the one or more items of anonymous personal identification information transmitted during the subsequent web browser session without relying on a cookie.

At step 817, the computing system 115 stores the one or more items of anonymous personal identification information in the user profile in the server 120 based on the attached open-source software footprint. In certain embodiments, the computing system 115 stores the one or more items of anonymous personal identification information transmitted during the subsequent browser session in the user profile in the server 120 based on the attached open-source software footprint. For example, the computing system 115 may have determined that the one or more items of anonymous personal identification information transmitted during the subsequent web browser session is associated with the electronic device 110 that stored the second cookie from the initial web browser session. The computing system 115 may store the one or more items of anonymous personal identification information in the same user profile that contains the electronic device identification and the one or more items of anonymous personal identification information contained in the second cookie from the initial web browser session based on mapping or associating the open-source software footprint attached to the one or more items of anonymous personal identification information obtained during the subsequent web browser session with the electronic device identification stored in the user profile in the server 120. Accordingly, the computing system 115 may store items of anonymous personal identification information in user profiles associated with specific electronic devices 110 without relying on the ability of the computing system to retrieve cookies stored in the memories of the electronic devices 110.

Figure 9:
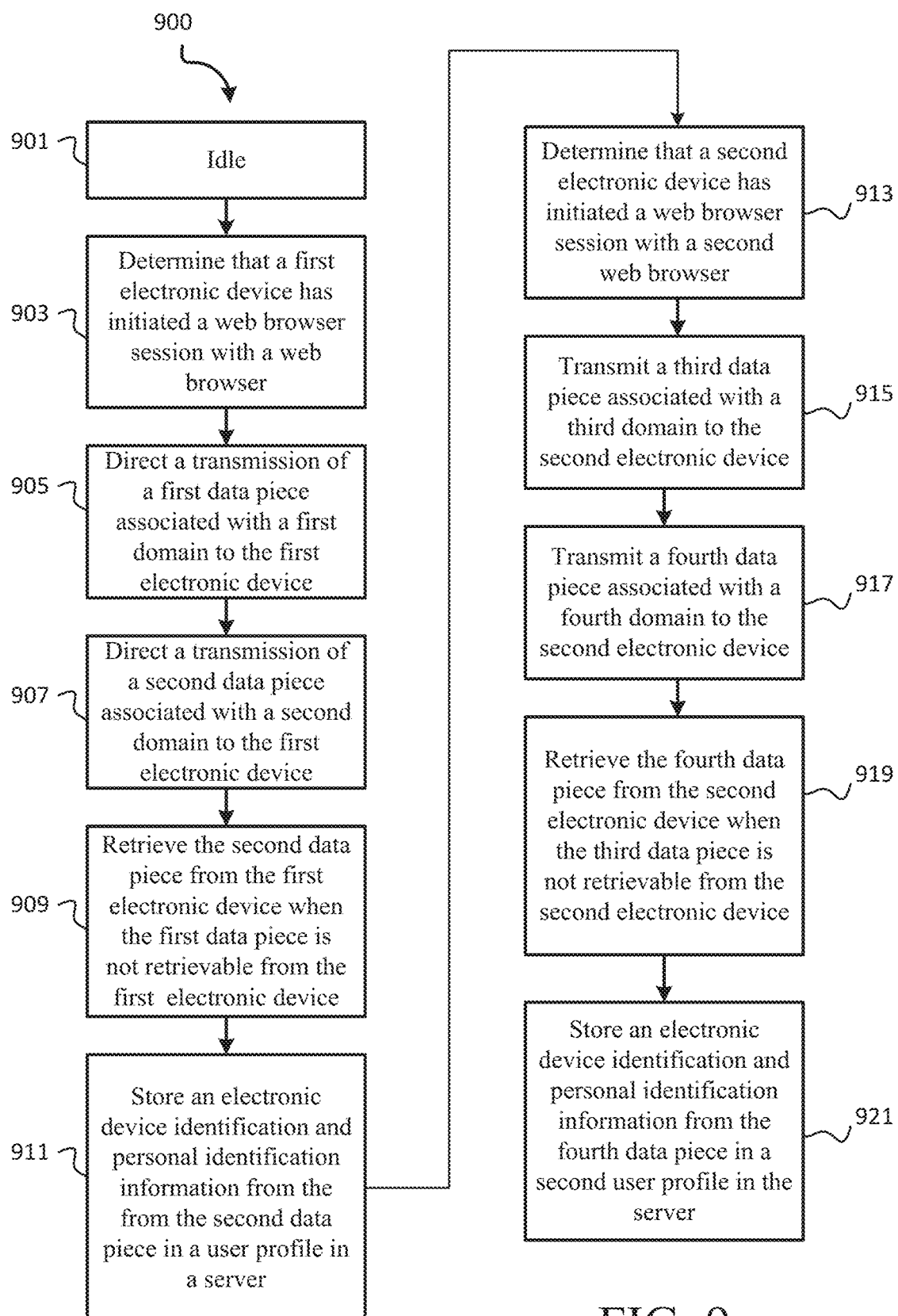

FIG. 9 illustrates a method 900 implemented by the computing system 115 for performing network interruption remedy operations according to certain embodiments of this disclosure. Although certain details will be provided with reference to the method 900 of FIG. 9, it should be understood that other embodiments may include more, less, or different method steps. At step 901, the computing system 115 is in an idle state at least with respect to performing network interruption remedy operations. At step 903, the computing system 115 determines that a first electronic device 110 has initiated an engagement in a first web browser session with a web browser 125 or that a first electronic device 110 has requested content from a web browser 125.

At step 905, the computing system 115 directs the transmission of a first data piece associated with a first domain to the first electronic device 110. In certain embodiments, the computing system 115 directs the transmission of the first data piece to the first electronic device 110, when the first electronic device 110 is engaged in the first web browser session on the web browser 125, for storage in an electronic device memory of the first electronic device 110. The first data piece may be associated with a first domain that is linked to the web browser 125 (e.g., the web browser domain). The first data piece may also contain an electronic device identification. The electronic device identification may be a unique identification that identifies the first electronic device among all electronic devices. For example, the electronic device identification may be an identification that is unique to the first electronic device 110. In certain embodiments, the electronic device identification includes at least one of a MAC address, an IMEI number, an electronic device serial number, a pointer associated with a data port of the electronic device, a combination thereof, or the like.

At step 907, the computing system 115 directs the transmission of a second data piece associated with a second domain to the first electronic device 110. In certain embodiments, the computing system 115 directs the transmission of a second data piece to the first electronic device 110, when the first electronic device 110 is engaged in the first web browser session on the web browser 125, for storage in the electronic device memory of the first electronic device 110. The second data piece may be associated with a second domain that is linked to the web browser 125 (e.g., the web browser domain). The second data piece may also contain an electronic device identification. The electronic device identification contained in the second data piece may be a same electronic device identification as the electronic device identification contained in the first data piece.

At step 909, the computing system 115 retrieves the second data piece from the first electronic device 110 when the first data piece is not retrievable from the first electronic device 110. In certain embodiments, the computing system 115 retrieves the second data piece from the electronic device memory of the first electronic device 110 when the computing system 115 is not able to retrieve the first data piece from the electronic device memory of the first electronic device 110. The first electronic device 110 may store and execute data piece blocking software (e.g., anti-identification software, pop-up blocker software, advertisement (ad) blocker software). For example, the data piece blocking software may flag or block specific strings of HTML code contained in certain data pieces or may flag or block data pieces associated with entire domains. The data piece blocking software may have flagged or blocked the first data piece due to a specific string of HTML code contained in the first data piece. Additionally, or alternatively, the data piece blocking software may have blocked access to all data pieces from the first domain including the first data piece residing in the electronic device memory of the first electronic device 110. In certain embodiments, the data piece blocking software may not have flagged or blocked the second data piece due to a lack of a specific string of HTML code contained in the second data piece that would cause the data piece blocking software to block the second data piece. Additionally, or alternatively, the data piece blocking software may not have blocked access to data pieces from the second domain including the second data piece residing in the electronic device memory of the first electronic device 110.

The data piece blocking software stored and executed on the first electronic device 110 may have prevented the computing system 115 from retrieving the first data piece from the memory of the first electronic device 110. For example, the data piece blocking software may have blocked data pieces from being stored on a memory of first electronic device 110 when the first electronic device 110 is engaged in the first web browser session on the web browser. Additionally, or alternatively, the data piece blocking software may have flagged data pieces that are stored in the memory of the first electronic device 110 to prevent access to those flagged data pieces stored in the memory of the first electronic device 110 when or after the first electronic device 110 is engaged in the first web browser session on the web browser.

In certain embodiments, the second data piece retrieved from the first electronic device 110 contains the electronic device identification and one or more items of anonymous personal identification information provided by the electronic device 110 during the first web browser session. For example, when the first electronic device 110 initiates the first web browser session with the web browser 125, the web browser 125 transmits a data piece to the memory of first electronic device 110. Similarly, the computing system 115 transmits the first data piece associated with the first domain and the second data piece associated with the second domain. Before the data piece from the web browser 125, the first data piece, and the second data piece are stored in the memory of the electronic device 110, each of the data piece from the web browser 125, the first data piece, and the second data piece include the electronic device identification. After the data piece from the web browser 125, the first data piece, and the second data piece are stored in the memory of the first electronic device 110, the first electronic device 110 may transmit one or more items of anonymous personal identification information to the web browser 125 during the first web browser session. In certain embodiments, the one or more items of anonymous personal identification information may include an email address, a postal address, a user identification (ID), a gender, an age group, a user interest, a combination thereof, or the like. In certain embodiments, the one or more items of anonymous personal identification information includes a hash value.

The transmitted one or more items of anonymous personal identification information may also be stored in the data piece from the web browser 125 residing in the memory of the first electronic device 110. The one or more items of anonymous personal identification information may be stored in the data piece from the web browser 125 residing in the memory of the first electronic device 110 so that the first electronic device 110 or the web browser 125 may quickly and easily access the anonymous personal identification information during a subsequent web browser session between the first electronic device 110 and the web browser 125. In addition, because the first data piece and the second data piece are linked to the web browser 125 via the first domain and the second domain, respectively, the anonymous personal identification information may also be stored in the first data piece and the second data piece residing in the memory of first electronic device 110. Thus, when the computing system 115 retrieves the second data piece from the memory of the first electronic device 110, the second data piece includes the electronic device identification and the one or more items of anonymous personal identification information provided by the first electronic device 110 during the first web browser session.

At step 911, the computing system 115 stores the electronic device identification and the one or more items of anonymous personal identification information from the second data piece in a user profile of a server 120. In certain embodiments, the computing system 115 stores the electronic device identification and the one or more items of anonymous personal identification information from the second data piece in a user profile previously created and stored on the server 120. For example, the computing system 115 may have previously generated a user profile containing at least one of an electronic device identification or one or more items of anonymous personal identification information provided in a previously obtained data piece. When the computing system 115 receives the second data piece containing the electronic device identification and the one or more items of anonymous personal identification information, the computing system 115 may match at least one of the electronic device identification or at least one of the one or more items of anonymous personal identification information from the second data piece with at least one of the electronic device identification or at least one of the one or more items of anonymous personal identification information stored in the user profile. When the computing system 115 identifies a match, the computing system 115 may store the electronic device identification and the one or more items anonymous personal identification information from the second data piece in the user profile in the server 120.

In certain embodiments, the computing system 115 stores electronic device identification and the one or more items of anonymous personal identity information from the second data piece in a newly created user profile stored in the server 120. For example, the computing system 115 may search through the server 120 to identify (e.g., find, locate) a user profile containing at least one of electronic device identification or one of one or more items of anonymous personal identification information that matches at least one of the electronic device identification or one of the one or more items of anonymous personal identification information contained in the second data piece. After searching through the server 120, the computing system 115 may determine that no match exists between at least one of the electronic device identification or one of the one or more items of anonymous personal identification information contained in the second data piece and at least one of electronic device identification or one of one or more items of anonymous personal identification information contained in a user profile of the server 120. In response, the computing system 115 may create a new user profile in the server 120 and store the electronic device identification and the one or more items of anonymous personal identification information from the second data piece in the newly created user profile.

At step 913, the computing system 115 determines that a second electronic device 110 has initiated an engagement in a second web browser session with the web browser 125 or that a second electronic device 110 has requested content from the web browser 125. At step 915, the computing system 115 directs the transmission of a third data piece associated with a third domain to the second electronic device 110. In certain embodiments, the computing system 115 directs the transmission of the third data piece to the second electronic device 110, when the second electronic device 110 is engaged in a second web browser session on the web browser 125, for storage in an electronic device memory of the second electronic device 110. The third data piece may be associated with a third domain that is linked to the web browser 125 (e.g., the web browser domain). The third data piece may also contain an electronic device identification. The electronic device identification may be a unique identification that identifies a specific electronic device among all electronic devices. For example, the electronic device identification may be an identification that is unique to the second electronic device 110. In certain embodiments, the electronic device identification includes at least one of a MAC address, an IMEI number, an electronic device serial number, a pointer associated with a data port of the electronic device, a combination thereof, or the like.

At step 917, the computing system 115 directs the transmission of a fourth data piece associated with a fourth domain to the second electronic device 110. In certain embodiments, the computing system 115 directs the transmission of a fourth data piece to the second electronic device 110, when the second electronic device 110 is engaged in the second web browser session on the web browser 125, for storage in the electronic device memory of the second electronic device 110. The fourth data piece may be associated with a fourth domain that is linked to the web browser 125 (e.g., the web browser domain). The fourth data piece may also contain an electronic device identification. The electronic device identification contained in the fourth data piece may be a same electronic device identification as the electronic device identification contained in the third data piece.

At step 919, the computing system 115 retrieves the fourth data piece from the second electronic device 110 when the third data piece is not retrievable from the second electronic device 110. In certain embodiments, the computing system 115 retrieves the fourth data piece from the electronic device memory of the second electronic device 110 when the computing system 115 is not able to retrieve the third data piece from the electronic device memory of the second electronic device 110. The second electronic device 110 may store and execute data piece blocking software (e.g., anti-identification software, pop-up blocker software, advertisement (ad) blocker software). For example, the data piece blocking software may flag or block specific strings of HTML code contained in certain data pieces or may flag or block data pieces associated with entire domains. The data piece blocking software may have flagged or blocked the third data piece due to a specific string of HTML code contained in the third data piece. Additionally, or alternatively, the data piece blocking software may have blocked access to all data pieces from the third domain including the third data piece residing in the electronic device memory of the second electronic device 110. In certain embodiments, the data piece blocking software may not have flagged or blocked the fourth data piece due to a lack of a specific string of HTML code contained in the fourth data piece that would cause the data piece blocking software to block the fourth data piece. Additionally, or alternatively, the data piece blocking software may not have blocked access to data pieces from the fourth domain including the fourth data piece residing in the electronic device memory of the second electronic device 110.

The data piece blocking software stored and executed on the second electronic device 110 may have prevented the computing system 115 from retrieving the third data piece from the memory of the second electronic device 110. For example, the data piece blocking software may have blocked data pieces from being stored on a memory of the second electronic device 110 when the second electronic device 110 is engaged in a second web browser session on the web browser. Additionally, or alternatively, the data piece blocking software may have flagged data pieces that are stored in the memory of the second electronic device 110 to prevent access to those flagged data pieces stored in the memory of the second electronic device 110 when or after the second electronic device 110 is engaged in the second web browser session on the web browser.

In certain embodiments, the fourth data piece retrieved from the second electronic device 110 contains the electronic device identification and one or more items of anonymous personal identification information provided by the second electronic device 110 during the second web browser session. For example, when the second electronic device 110 initiates the second web browser session with the web browser 125, the web browser 125 transmits a data piece to the memory of second electronic device 110. Similarly, the computing system 115 transmits the third data piece associated with the third domain and the fourth data piece associated with the fourth domain. Before the data piece from the web browser 125, the third data piece, and the fourth data piece are stored in the memory of the second electronic device 110, each of the data piece from the web browser 125, the third data piece, and the fourth data piece includes the electronic device identification. After the data piece from the web browser 125, the third data piece, and the fourth data piece are stored in the memory of the second electronic device 110, the second electronic device 110 may transmit one or more items of anonymous personal identification information to the web browser 125 during the second web browser session. In certain embodiments, the one or more items of anonymous personal identification information may include an email address, a postal address, a user identification (ID), a gender, an age group, a user interest, a combination thereof, or the like. In certain embodiments, the one or more items of anonymous personal identification information includes a hash value.

The transmitted one or more items of anonymous personal identification information may also be stored in the data piece from the web browser 125 residing in the memory of the second electronic device 110. The one or more items of anonymous personal identification information may be stored in the data piece from the web browser 125 residing in the memory of the second electronic device 110 so that the second electronic device 110 or the web browser 125 may quickly and easily access the anonymous personal identification information during a subsequent web browser session between the electronic device 110 and the web browser 125. In addition, because the third data piece and the fourth data piece are linked to the web browser 125 via the third domain and the fourth domain, respectively, the anonymous personal identification information may also be stored in the third data piece and the fourth data piece residing in the memory of second electronic device 110. Thus, when the computing system 115 retrieves the fourth data piece from the memory of the second electronic device 110, the fourth data piece includes the electronic device identification and the one or more items of anonymous personal identification information provided by the second electronic device 110 during the second web browser session.

At step 921, the computing system 115 stores the electronic device identification and the one or more items of anonymous personal identification information from the fourth data piece in a user profile of a server 120. In certain embodiments, the computing system 115 stores the electronic device identification and the one or more items of anonymous personal identification information from the fourth data piece in a user profile previously created and stored on the server 120. For example, the computing system 115 may have previously generated a user profile containing at least one of an electronic device identification or one or more items of anonymous personal identification information provided in a previously obtained data piece. When the computing system 115 receives the fourth data piece containing the electronic device identification and the one or more items of anonymous personal identification information, the computing system 115 may match at least one of the electronic device identification or at least one of the one or more items of anonymous personal identification information from the fourth data piece with at least one of the electronic device identification or at least one of the one or more items of anonymous personal identification information stored in the user profile. When the computing system 115 identifies a match, the computing system 115 may store the electronic device identification and the one or more items anonymous personal identification information from the fourth data piece in the user profile in the server 120.

In certain embodiments, the computing system 115 stores electronic device identification and the one or more items of anonymous personal identity information from the fourth data piece in a newly created user profile stored in the server 120. For example, the computing system 115 may search through the server 120 to identify (e.g., find, locate) a user profile containing at least one of electronic device identification or one of one or more items of anonymous personal identification information that matches at least one of the electronic device identification or one of the one or more items of anonymous personal identification information contained in the fourth data piece. After searching through the server 120, the computing system 115 may determine that no match exists between at least one of the electronic device identification or one of the one or more items of anonymous personal identification information contained in the fourth data piece and at least one of electronic device identification or one of one or more items of anonymous personal identification information contained in a user profile of the server 120. In response, the computing system 115 may create a new user profile in the server 120 and store the electronic device identification and the one or more items of anonymous personal identification information from the fourth data piece in the newly created user profile.

Figure 10:
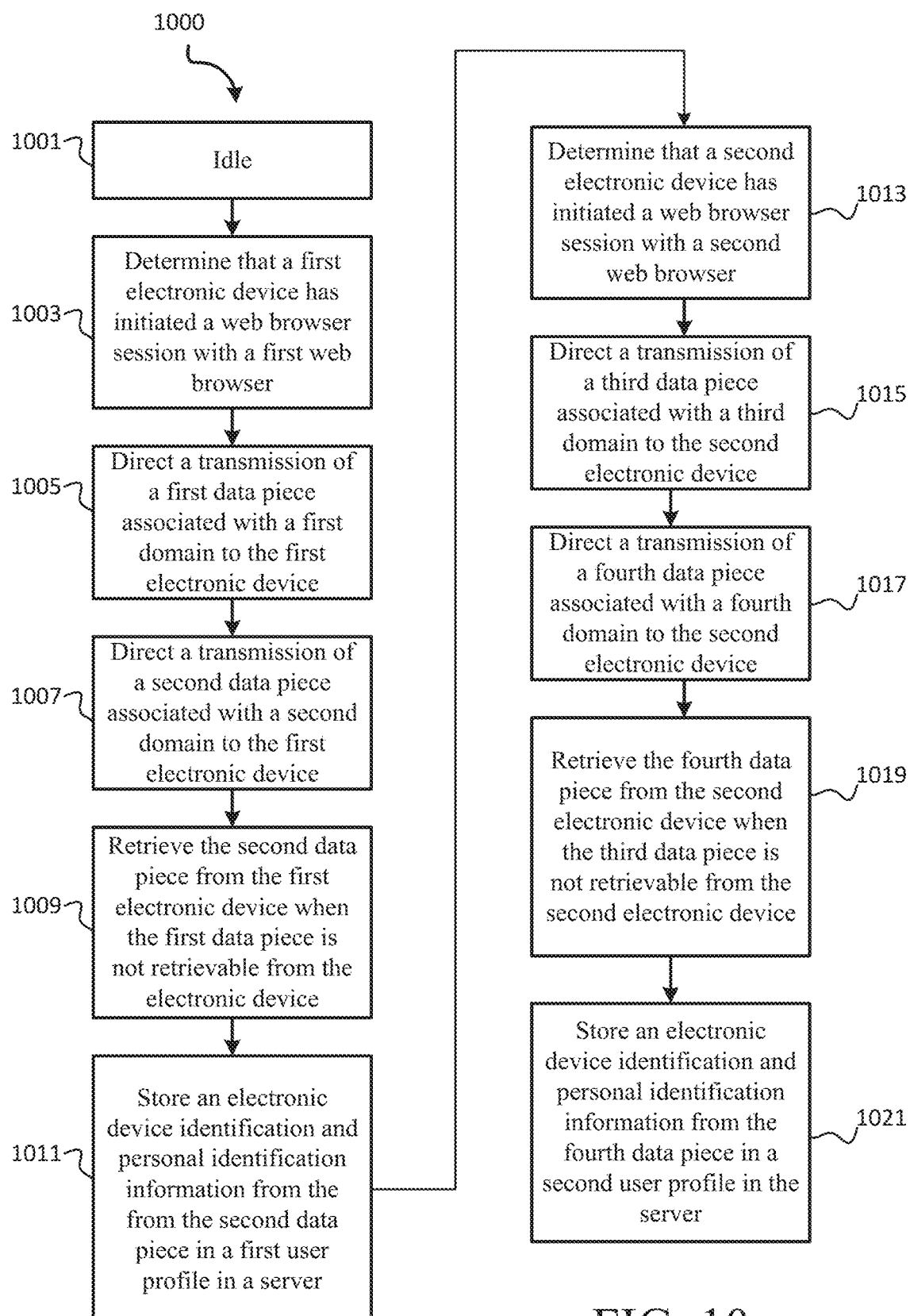

FIG. 10 illustrates a method 1000 implemented by the computing system 115 for performing network interruption remedy operations according to certain embodiments of this disclosure. Although certain details will be provided with reference to the method 1000 of FIG. 10, it should be understood that other embodiments may include more, less, or different method steps. At step 1001, the computing system 115 is in an idle state at least with respect to performing network interruption remedy operations. At step 1003, the computing system 115 determines that a first electronic device 110 has initiated an engagement in a web browser session with a first web browser 125 or that a first electronic device 110 has requested content from a first web browser 125.

At step 1005, the computing system 115 directs the transmission of a first data piece associated with a first domain to the first electronic device 110. In certain embodiments, the computing system 115 directs the transmission of the first data piece to the first electronic device 110, when the first electronic device 110 is engaged in the web browser session on the first web browser 125, for storage in an electronic device memory of the first electronic device 110. The first data piece may be associated with a first domain that is linked to the first web browser 125 (e.g., the web browser domain). The first data piece may also contain an electronic device identification. The electronic device identification may be a unique identification that identifies the first electronic device among all electronic devices. For example, the electronic device identification may be an identification that is unique to the first electronic device 110. In certain embodiments, the electronic device identification includes at least one of a MAC address, an IMEI number, an electronic device serial number, a pointer associated with a data port of the electronic device, a combination thereof, or the like.

At step 1007, the computing system 115 directs the transmission of a second data piece associated with a second domain to the first electronic device 110. In certain embodiments, the computing system 115 directs the transmission of a second data piece to the first electronic device 110, when the first electronic device 110 is engaged in the web browser session on the first web browser 125, for storage in the electronic device memory of the first electronic device 110. The second data piece may be associated with a second domain that is linked to the first web browser 125 (e.g., the first web browser domain). The second data piece may also contain an electronic device identification. The electronic device identification contained in the second data piece may be a same electronic device identification as the electronic device identification contained in the first data piece.

At step 1009, the computing system 115 retrieves the second data piece from the first electronic device 110 when the first data piece is not retrievable from the first electronic device 110. In certain embodiments, the computing system 115 retrieves the second data piece from the electronic device memory of the first electronic device 110 when the computing system 115 is not able to retrieve the first data piece from the electronic device memory of the first electronic device 110. The first electronic device 110 may store and execute data piece blocking software (e.g., anti-identification software, pop-up blocker software, advertisement (ad) blocker software). For example, the data piece blocking software may flag or block specific strings of HTML code contained in certain data pieces or may flag or block data pieces associated with entire domains. The data piece blocking software may have flagged or blocked the first data piece due to a specific string of HTML code contained in the first data piece. Additionally, or alternatively, the data piece blocking software may have blocked access to all data pieces from the first domain including the first data piece residing in the electronic device memory of the first electronic device 110. In certain embodiments, the data piece blocking software may not have flagged or blocked the second data piece due to a lack of a specific string of HTML code contained in the second data piece that would cause the data piece blocking software to block the second data piece. Additionally. or alternatively, the data piece blocking software may not have blocked access to data pieces from the second domain including the second data piece residing in the electronic device memory of the first electronic device 110.

The data piece blocking software stored and executed on the first electronic device 110 may have prevented the computing system 115 from retrieving the first data piece from the memory of the first electronic device 110. For example, the data piece blocking software may have blocked data pieces from being stored on a memory of first electronic device 110 when the first electronic device 110 is engaged in the web browser session on the first web browser. Additionally, or alternatively, the data piece blocking software may have flagged data pieces that are stored in the memory of the first electronic device 110 to prevent access to those flagged data pieces stored in the memory of the first electronic device 110 when or after the first electronic device 110 is engaged in the web browser session on the first web browser.

In certain embodiments, the second data piece retrieved from the first electronic device 110 contains the electronic device identification and one or more items of anonymous personal identification information provided by the first electronic device 110 during the web browser session on the first web browser 125. For example, when the first electronic device 110 initiates the web browser session with the first web browser 125, the first web browser 125 transmits a data piece to the memory of first electronic device 110. Similarly, the computing system 115 transmits the first data piece associated with the first domain and the second data piece associated with the second domain. Before the data piece from the first web browser 125, the first data piece, and the second data piece are stored in the memory of the first electronic device 110, each of the data piece from the first web browser 125, the first data piece, and the second data piece include the electronic device identification. After the data piece from the first web browser 125, the first data piece, and the second data piece are stored in the memory of the first electronic device 110, the first electronic device 110 may transmit one or more items of anonymous personal identification information to the first web browser 125 during the first web browser session. In certain embodiments, the one or more items of anonymous personal identification information may include an email address, a postal address, a user identification (ID), a gender, an age group, a user interest, a combination thereof, or the like. In certain embodiments, the one or more items of anonymous personal identification information includes a hash value.

The transmitted one or more items of anonymous personal identification information may also be stored in the data piece from the first web browser 125 residing in the memory of the first electronic device 110. The one or more items of anonymous personal identification information may be stored in the data piece from the first web browser 125 residing in the memory of the first electronic device 110 so that the first electronic device 110 or the first web browser 125 may quickly and easily access the anonymous personal identification information during a subsequent web browser session between the first electronic device 110 and the first web browser 125. In addition, because the first data piece and the second data piece are linked to the first web browser 125 via the first domain and the second domain, respectively, the anonymous personal identification information may also be stored in the first data piece and the second data piece residing in the memory of first electronic device 110. Thus, when the computing system 115 retrieves the second data piece from the memory of the first electronic device 110, the second data piece includes the electronic device identification and the one or more items of anonymous personal identification information provided by the first electronic device 110 during the web browser session.

At step 1011, the computing system 115 stores the electronic device identification and the one or more items of anonymous personal identification information from the second data piece in a first user profile of a server 120. In certain embodiments, the computing system 115 stores the electronic device identification and the one or more items of anonymous personal identification information from the second data piece in a first user profile previously created and stored on the server 120. For example, the computing system 115 may have previously generated a first user profile containing at least one of an electronic device identification or one or more items of anonymous personal identification information provided in a previously obtained data piece. When the computing system 115 receives the second data piece containing the electronic device identification and the one or more items of anonymous personal identification information, the computing system 115 may match at least one of the electronic device identification or at least one of the one or more items of anonymous personal identification information from the second data piece with at least one of the electronic device identification or at least one of the one or more items of anonymous personal identification information stored in the first user profile. When the computing system 115 identifies a match, the computing system 115 may store the electronic device identification and the one or more items anonymous personal identification information from the second data piece in the first user profile in the server 120.

In certain embodiments, the computing system 115 stores electronic device identification and the one or more items of anonymous personal identity information from the second data piece in a newly created first user profile stored in the server 120. For example, the computing system 115 may search through the server 120 to identify (e.g., find, locate) a user profile containing at least one of electronic device identification or one of one or more items of anonymous personal identification information that matches at least one of the electronic device identification or one of the one or more items of anonymous personal identification information contained in the second data piece. After searching through the server 120, the computing system 115 may determine that no match exists between at least one of the electronic device identification or one of the one or more items of anonymous personal identification information contained in the second data piece and at least one of electronic device identification or one of one or more items of anonymous personal identification information contained in a user profile of the server 120. In response, the computing system 115 may create a new first user profile in the server 120 and store the electronic device identification and the one or more items of anonymous personal identification information from the second data piece in the newly created first user profile.

At step 1013, the computing system 115 determines that a second electronic device 110 has initiated an engagement in a web browser session with a second web browser 125 or that a second electronic device 110 has requested content from a second web browser 125. At step 1015, the computing system 115 directs the transmission of a third data piece associated with a third domain to the second electronic device 110. In certain embodiments, the computing system 115 directs the transmission of the third data piece to the second electronic device 110, when the second electronic device 110 is engaged in a web browser session on the second web browser 125, for storage in an electronic device memory of the second electronic device 110. The third data piece may be associated with a third domain that is linked to the second web browser 125 (e.g., the second web browser domain). The third data piece may also contain an electronic device identification. The electronic device identification may be a unique identification that identifies a specific electronic device among all electronic devices. For example, the electronic device identification may be an identification that is unique to the second electronic device 110. In certain embodiments, the electronic device identification includes at least one of a MAC address, an IMEI number, an electronic device serial number, a pointer associated with a data port of the electronic device, a combination thereof, or the like.

At step 1017, the computing system 115 directs the transmission of a fourth data piece associated with a fourth domain to the second electronic device 110. In certain embodiments, the computing system 115 directs the transmission of a fourth data piece to the second electronic device 110, when the second electronic device 110 is engaged in the web browser session on the second web browser 125, for storage in the electronic device memory of the second electronic device 110. The fourth data piece may be associated with a fourth domain that is linked to the second web browser 125 (e.g., the second web browser domain). The fourth data piece may also contain an electronic device identification. The electronic device identification contained in the fourth data piece may be a same electronic device identification as the electronic device identification contained in the third data piece.

At step 1019, the computing system 115 retrieves the fourth data piece from the second electronic device 110 when the third data piece is not retrievable from the second electronic device 110. In certain embodiments, the computing system 115 retrieves the fourth data piece from the electronic device memory of the second electronic device 110 when the computing system 115 is not able to retrieve the third data piece from the electronic device memory of the second electronic device 110. The second electronic device 110 may store and execute data piece blocking software (e.g., anti-identification software, pop-up blocker software, advertisement (ad) blocker software). For example, the data piece blocking software may flag or block specific strings of HTML code contained in certain data pieces or may flag or block data pieces associated with entire domains. The data piece blocking software may have flagged or blocked the third data piece due to a specific string of HTML code contained in the third data piece. Additionally, or alternatively, the data piece blocking software may have blocked access to all data pieces from the third domain including the third data piece residing in the electronic device memory of the second electronic device 110. In certain embodiments, the data piece blocking software may not have flagged or blocked the fourth data piece due to a lack of a specific string of HTML code contained in the fourth data piece that would cause the data piece blocking software to block the fourth data piece. Additionally, or alternatively, the data piece blocking software may not have blocked access to data pieces from the fourth domain including the fourth data piece residing in the electronic device memory of the second electronic device 110.

The data piece blocking software stored and executed on the second electronic device 110 may have prevented the computing system 115 from retrieving the third data piece from the memory of the second electronic device 110. For example, the data piece blocking software may have blocked data pieces from being stored on a memory of the second electronic device 110 when the second electronic device 110 is engaged in the web browser session on the second web browser. Additionally, or alternatively, the data piece blocking software may have flagged data pieces that are stored in the memory of the second electronic device 110 to prevent access to those flagged data pieces stored in the memory of the second electronic device 110 when or after the second electronic device 110 is engaged in the web browser session on the second web browser.

In certain embodiments, the fourth data piece retrieved from the second electronic device 110 contains the electronic device identification and one or more items of anonymous personal identification information provided by the second electronic device 110 during the web browser session on the second web browser 125. For example, when the second electronic device 110 initiates the web browser session with the second web browser 125, the second web browser 125 transmits a data piece to the memory of the second electronic device 110. Similarly, the computing system 115 transmits the third data piece associated with the third domain and the fourth data piece associated with the fourth domain. Before the data piece from the second web browser 125, the third data piece, and the fourth data piece are stored in the memory of the second electronic device 110, each of the data piece from the second web browser 125, the third data piece, and the fourth data piece includes the electronic device identification. After the data piece from the second web browser 125, the third data piece, and the fourth data piece are stored in the memory of the second electronic device 110, the second electronic device 110 may transmit one or more items of anonymous personal identification information to the second web browser 125 during the web browser session. In certain embodiments, the one or more items of anonymous personal identification information may include an email address, a postal address, a user identification (ID), a gender, an age group, a user interest, a combination thereof, or the like. In certain embodiments, the one or more items of anonymous personal identification information includes a hash value.

The transmitted one or more items of anonymous personal identification information may also be stored in the data piece from the second web browser 125 residing in the memory of the second electronic device 110. The one or more items of anonymous personal identification information may be stored in the data piece from the second web browser 125 residing in the memory of the second electronic device 110 so that the second electronic device 110 or the second web browser 125 may quickly and easily access the anonymous personal identification information during a subsequent web browser session between the electronic device 110 and the subsequent web browser 125. In addition, because the third data piece and the fourth data piece are linked to the second web browser 125 via the third domain and the fourth domain, respectively, the anonymous personal identification information may also be stored in the third data piece and the fourth data piece residing in the memory of second electronic device 110. Thus, when the computing system 115 retrieves the fourth data piece from the memory of the second electronic device 110, the fourth data piece includes the electronic device identification and the one or more items of anonymous personal identification information provided by the second electronic device 110 during the web browser session on the second web browser.

At step 1021, the computing system 115 stores the electronic device identification and the one or more items of anonymous personal identification information from the fourth data piece in a second user profile of a server 120. In certain embodiments, the computing system 115 stores the electronic device identification and the one or more items of anonymous personal identification information from the fourth data piece in a second user profile previously created and stored on the server 120. For example, the computing system 115 may have previously generated a second user profile containing at least one of an electronic device identification or one or more items of anonymous personal identification information provided in a previously obtained data piece. When the computing system 115 receives the fourth data piece containing the electronic device identification and the one or more items of anonymous personal identification information, the computing system 115 may match at least one of the electronic device identification or at least one of the one or more items of anonymous personal identification information from the fourth data piece with at least one of the electronic device identification or at least one of the one or more items of anonymous personal identification information stored in the second user profile. When the computing system 115 identifies a match, the computing system 115 may store the electronic device identification and the one or more items anonymous personal identification information from the fourth data piece in the second user profile in the server 120.

In certain embodiments, the computing system 115 stores electronic device identification and the one or more items of anonymous personal identity information from the fourth data piece in a newly created second user profile stored in the server 120. For example, the computing system 115 may search through the server 120 to identify (e.g., find, locate) a user profile containing at least one of electronic device identification or one of one or more items of anonymous personal identification information that matches at least one of the electronic device identification or one of the one or more items of anonymous personal identification information contained in the fourth data piece. After searching through the server 120, the computing system 115 may determine that no match exists between at least one of the electronic device identification or one of the one or more items of anonymous personal identification information contained in the fourth data piece and at least one of electronic device identification or one of one or more items of anonymous personal identification information contained in a user profile of the server 120. In response, the computing system 115 may create a new second user profile in the server 120 and store the electronic device identification and the one or more items of anonymous personal identification information from the fourth data piece in the newly created second user profile.

Figure 11:
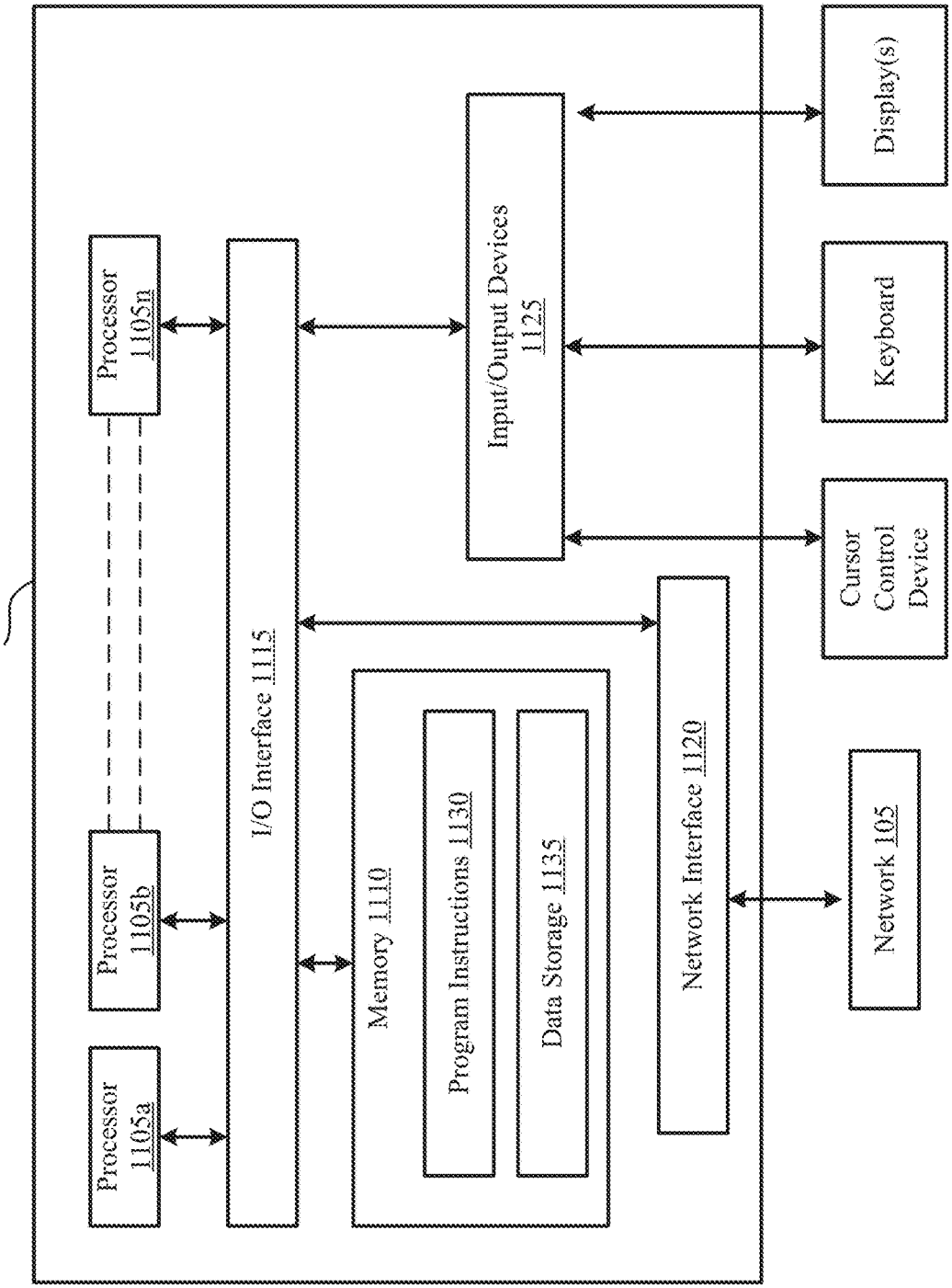
FIG. 11 illustrates a non-limiting, example computer system configured to implement aspects of systems and methods according to certain embodiments of this disclosure.

FIG. 11 illustrates a non-limiting, example computer system 1100 configured to implement systems and methods for performing network interruption remedy operations according to certain embodiments of this disclosure. FIG. 11 illustrates a computer system 1100 that is configured to execute any and all of the embodiments described herein. In certain embodiments, the computer system 1100 describes at least some of the components of computing system 115 illustrated in FIGS. 1 and 2. In certain embodiments, the computer system 1100 describes at least some of the components of the one or more electronic devices 110, the one or more servers 120, or electronics that provide the one or more web browsers 125 illustrated in FIG. 1. In different embodiments, the computer system 1100 may be any of various types of devices, including, but not limited to, a computer embedded in a vehicle, a computer embedded in an appliance, a personal computer system, a desktop computer, a handset, a laptop computer, a notebook computer, a tablet, a slate, a netbook computer, a camera, a handheld video game device, a handheld computer, a video recording device, a consumer device, a portable storage device, a mainframe computer system, a workstation, network computer, a set top box, a video game console, a mobile device, an application server, a storage device, a television, a peripheral device such as a switch, a modem, a router, or in general any type of computing or electronic device.

Various embodiments of a system and method for performing network interruption remedy operations, as described herein, may be executed on one or more computer systems 1100, which may interact with various other devices. In the illustrated embodiment, the computer system 1100 includes one or more processors 1105 coupled to a system memory 1110 via an input/output (I/O) interface 1115. The computer system 1100 further includes a network interface 1120 coupled to I/O interface 1115, and one or more input/output devices 1125, such as cursor control device, keyboard, and display(s). In some cases, it is contemplated that embodiments may be implemented using a single instance of computer system 1100, while in other embodiments multiple such systems, or multiple nodes making up computer system 1100, may be configured to host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1105a, or a multiprocessor system including several processors 1105a-1105n (e.g., two, four, eight, or another suitable number). The processors 1105 may be any suitable processor capable of executing instructions. For example, in various embodiments the processors 1105 may be general-purpose or embedded processors implementing any of a variety of instruction set architectures (ISAs), such as the x86. PowerPC. SPARC, or MIPS ISAs, or any other suitable ISA. In multiprocessor systems, each of processors 1105 may commonly, but not necessarily, implement the same ISA.

The system memory 1110 may be configured to store the program instructions 1130 and/or existing state information and ownership transition condition data in the data storage 1135 accessible by the processor 1105. In various embodiments, the system memory 1110 may be implemented using any suitable memory technology, such as static random access memory (SRAM), synchronous dynamic RAM (SDRAM), nonvolatile/Flash-type memory, or any other type of memory. In the illustrated embodiment, the program instructions 1130 may be configured to implement a system for performing network interruption remedy operations incorporating any of the functionality, as described herein. In some embodiments, program instructions and/or data may be received, sent, or stored upon different types of computer-accessible media or on similar media separate from the system memory 1110 or the computer system 1100. The computer system 1100 is described as implementing at least some of the functionality of functional blocks of previous Figures.

In one embodiment, the I/O interface 1115 may be configured to coordinate I/O traffic between the processor 1105, the system memory 1110, and any peripheral devices in the device, including the network interface 1120 or other peripheral interfaces, such as the input/output devices 1125. In some embodiments, the I/O interface 1115 may perform any necessary protocol, timing or other data transformations to convert data signals from one component (e.g., the system memory 1110) into a format suitable for use by another component (e.g., the processor 1105). In some embodiments, the I/O interface 1115 may include support for devices attached through various types of peripheral buses, such as a variant of the Peripheral Component Interconnect (PCI) bus standard or the Universal Serial Bus (USB) standard, for example. In some embodiments, the function of the I/O interface 1115 may be split into two or more separate components, such as a north bridge and a south bridge, for example. Also, in some embodiments some or all of the functionality of the I/O interface 1115, such as an interface to the system memory 1110, may be incorporated directly into the processor 1105.

The network interface 1120 may be configured to allow data to be exchanged between the computer system 1100 and other devices attached to the network 105 or between nodes of the computer system 1100. The network 105 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof, or the like. In various embodiments, the network interface 1120 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

The input/output devices 1125 may, in some embodiments, include one or more display terminals, keyboards, keypads, touchpads, scanning devices, voice, or optical recognition devices, or any other devices suitable for entering or accessing data by one or more the computer systems 1100. Further, various other sensors may be included in the I/O devices 1125, such as imaging sensors, barometers, altimeters, LIDAR, or any suitable environmental sensor. Multiple input/output devices 1125 may be present in the computer system 1100 or may be distributed on various nodes of the computer system 1100. In some embodiments, similar input/output devices may be separate from the computer system 1100 and may interact with one or more nodes of the computer system 1100 through a wired or wireless connection, such as over the network interface 1120.

As shown in FIG. 11, the memory 1110 may include program instructions 1130, which may be processor-executable to implement any element or action, as described herein. In one embodiment, the program instructions may implement at least a portion of methods described herein, such as the methods illustrated by FIGS. 4-10. In other embodiments, different elements and data may be included. Note that the data storage 1135 may include any data or information, as described herein.

Those skilled in the art will appreciate that the computer system 1100 is merely illustrative and is not intended to limit the scope of embodiments. In particular, the computer system and devices may include any combination of hardware or software that can perform the indicated functions, including computers, network devices. Internet appliances. PDAs, wireless phones, pagers, GPUs, specialized computer systems, information handling apparatuses, or the like. The computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions, structured data) on a computer-accessible medium or a portable article to be read by an appropriate drive, various examples of which are described here. In some embodiments, instructions stored on a computer-accessible medium separate from the computer system 1100 may be transmitted to the computer system 1100 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, or the like), ROM, or the like. In some embodiments, a computer-accessible medium may include transmission media or signals such as electrical, electromagnetic, or digital signals, conveyed via a communication medium such as network and/or a wireless link.

Thus, the disclosure provides, among other things, a system for performing network interruption remedy operations, including a computing system. The computing system is configured for contemporaneously and continuously sending data pieces or cookies to millions of electronic devices located and mobile around the world and engaged in web browser sessions on millions of different web browsers. The computing system is also configured for contemporaneously and continuously retrieving data pieces and cookies from the millions of electronic devices located and mobile around the world and engaged in web browser sessions on millions of different web browsers. The computing system is further configured for contemporaneously and continuously storing the retrieved data pieces and cookies from the millions of electronic device located and mobile around the world and engaged in web browser sessions on millions of different web browsers in select user profiles stored in a plurality of server. In addition, the computing system is configured for contemporaneously and continuously matching electronic device identifications and items of anonymous personal identification information provided in each of the millions of data pieces and cookies with electronic device identifications and items of anonymous personal identification information in the millions of user profiles stored in the plurality of servers to select the appropriate user profile(s) for storing electronic device identifications and items of anonymous personal identification information provided in each of the millions of data pieces and cookies. Various features and advantages of the disclosure are set forth in the following claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An apparatus, comprising:
a computing system communicatively linked to a server and comprising a memory and at least one processor, wherein the computing system is configured to:
  direct a transmission of a first data piece to a first electronic device, when the first electronic device is engaged in an initial web browser session on an initial web browser, for storage in a first electronic device memory, wherein the first data piece is associated with a first domain that is linked to the initial web browser, and wherein the first data piece contains a first electronic device identification,
  direct a transmission of a second data piece to the first electronic device, when the first electronic device is engaged in the initial web browser session on the initial web browser, for storage in the first electronic device memory, wherein the second data piece is associated with a second domain that is linked to the initial web browser, and wherein the second data piece contains the first electronic device identification,
  retrieve the second data piece from the first electronic device memory when the computing system is not able to retrieve the first data piece from the first electronic device memory, wherein the second data piece retrieved from the first electronic device contains the first electronic device identification and one or more items of anonymous personal identification information provided by the first electronic device during the initial web browser session,
  store the second data piece in a first user profile in the server,
  direct a transmission of a third data piece to a second electronic device, when the second electronic device is engaged in a subsequent web browser session on the initial web browser, for storage in a second electronic device memory, wherein the third data piece is associated with a third domain that is linked to the initial web browser, and wherein the third data piece contains a second electronic device identification,
  direct a transmission of a fourth data piece to the second electronic device, when the second electronic device is engaged in the subsequent web browser session on the initial web browser, for storage in the second electronic device memory, wherein the fourth data piece is associated with a fourth domain that is linked to the initial web browser, and wherein the fourth data piece contains the second electronic device identification, and
  retrieve the fourth data piece from the second electronic device memory when the computing system is not able to retrieve the third data piece from the second electronic device memory, wherein the fourth data piece retrieved from the second electronic device contains the second electronic device identification and one or more items of anonymous personal identification information provided by the second electronic device during the subsequent web browser session.

2. The apparatus of claim 1, wherein the first electronic device includes an electronic device display screen, the first electronic device memory, and at least one electronic device processor, and wherein the first electronic device is configured to access and display one or more browsers on the electronic device display screen.

3. The apparatus of claim 1 wherein the computing system is further configured to:
   determine that the first electronic device is engaged in the initial web browser session on the initial web browser.

4. The apparatus of claim 1 wherein the computing system is further configured to:
   retrieve the first data piece from the first electronic device memory when the computing system is not able to retrieve the second data piece from the first electronic device memory, wherein the first data piece retrieved from the electronic device includes the electronic device identification and the one or more items of anonymous personal identification information provided by the first electronic device during the initial web browser session.

5. The apparatus of claim 1, wherein the computing system is further configured to:
   retrieve the first data piece and the second data piece from the first electronic device memory, wherein each of the first data piece and the second data piece retrieved from the first electronic device includes the first electronic device identification and the one or more items of anonymous personal identification information provided by the first electronic device during the initial web browser session.

6. The apparatus of claim 1, wherein the computing system is further configured to:
   store a fifth data piece in the user profile in the server in response to matching at least one item of the one or more items of anonymous personal identification information from the second data piece with one or more items of anonymous personal identification information from the fifth data piece.

7. The apparatus of claim 1, wherein the first data piece and the second data piece are cookies.

8. The apparatus of claim 1, wherein the one or more items of anonymous personal identification information includes one or more of an email addresses, a postal address, a user JD, a gender, an age group, or a user interest.

9. The apparatus of claim 1, wherein the first electronic device identification includes at least one of a MAC addresses, an IMEI number, an electronic device serial number, or a pointer associated with a data port of the first electronic device.

10. The apparatus of claim 1, wherein each of the one or more items of anonymous personal identification information comprises a hash value.

11. The apparatus of claim 1 wherein:
    the second data piece is a data piece of a plurality of data pieces; and
    the computing system is further configured to:
       direct a transmission of the plurality of data pieces to the first electronic device, when the electronic device is engaged in the initial web browser session on the initial web browser, for storage in the electronic device memory, wherein each of the plurality of data pieces is associated with a different domain that is linked into a chain of domains that includes the second domain, wherein each of the plurality of data pieces is retrievable by the computing system from the electronic device memory, and wherein each of the plurality of data pieces contains the first electronic device identification, and
       retrieve the plurality of data pieces from the first electronic device memory when the computing system is not able to retrieve the first data piece from the first electronic device memory, wherein each of the plurality of data pieces retrieved from the first electronic device memory contains the first electronic device identification and the one or more items of anonymous personal identification information provided by the first electronic device during the initial web browser session.

12. The apparatus of claim 11, wherein the computing system is further configured to:
    link each of the different domains into the chain of domains that includes the second domain based on determining that each of the different domains is able to store a data piece on the first electronic device memory that is retrievable by the computing system.

13. The apparatus of claim 1, wherein the computing system is further configured to:
    store the fourth data piece in a second user profile in the server.

14. An apparatus, comprising:
   a computing system communicatively linked to a server and comprising a memory and at least one processor, wherein the computing system is configured to:
      direct a transmission of a first data piece to a first electronic device, when the first electronic device is engaged in an initial web browser session on an initial web browser, for storage in a first electronic device memory, wherein the first data piece is associated with a first domain that is linked to the initial web browser, and wherein the first data piece contains a first electronic device identification,
      direct a transmission of a second data piece to the first electronic device, when the first electronic device is engaged in the initial web browser session on the initial web browser, for storage in the first electronic device memory, wherein the second data piece is associated with a second domain that is linked to the initial web browser, and wherein the second data piece contains the first electronic device identification,
      retrieve the second data piece from the first electronic device memory when the computing system is not able to retrieve the first data piece from the first electronic device memory, wherein the second data piece retrieved from the first electronic device contains the first electronic device identification and one or more items of anonymous personal identification information provided by the first electronic device during the initial web browser session,
      store the second data piece in a first user profile in the server,
      direct a transmission of a third data piece to a second electronic device, when the second electronic device is engaged in a web browser session on a subsequent web browser, for storage in a second electronic device memory, wherein the third data piece is associated with a third domain that is linked to the subsequent web browser, and wherein the third data piece contains a second electronic device identification, direct a transmission of a fourth data piece to the second electronic device, when the second electronic device is engaged in the web browser session on the subsequent web browser, for storage in the second electronic device memory, wherein the fourth data piece is associated with a fourth domain that is linked to the subsequent web browser, and wherein the fourth data piece contains the second electronic device identification, and retrieve the fourth data piece from the second electronic device memory when the computing system is not able to retrieve the third data piece from the second electronic device memory, wherein the fourth data piece retrieved from the second electronic device contains the second electronic device identification and one or more items of anonymous personal identification information provided by the second electronic device during the web browser session.

15. The apparatus of claim 14, wherein the computing system is further configured to:

store the fourth data piece in a second user profile in the server.

16. A computer-implemented method, comprising:

directing, by a computing system, a transmission of a first data piece to a first electronic device, when the first electronic device is engaged in an initial web browser session on an initial web browser, for storage in a first electronic device memory, wherein the first data piece is associated with a first domain that is linked to the initial web browser, and wherein the first data piece contains a first electronic device identification;

directing, by the computing system, a transmission of a second data piece to the first electronic device, when the first electronic device is engaged in the initial web browser session on the initial web browser, for storage in the first electronic device memory, wherein the second data piece is associated with a second domain that is linked to the initial web browser, and wherein the second data piece contains the first electronic device identification;

retrieving, by the computing system, the second data piece from the first electronic device memory when the computing system is not able to retrieve the first data piece from the first electronic device memory due to data piece blocking software stored and executed by the first electronic device, wherein the second data piece retrieved from the first electronic device contains the first electronic device identification and one or more items of anonymous personal identification information provided by the first electronic device during the initial web browser session;

storing, by the computing system, the second data piece in a first user profile in the server;

directing, by the computing system, a transmission of a third data piece to a second electronic device, when the second electronic device is engaged in a subsequent web browser session on the initial web browser or a subsequent web browser, for storage in a second electronic device memory, wherein the third data piece is associated with a third domain that is linked to the initial web browser or the subsequent web browser, and wherein the third data piece contains a second electronic device identification;

directing, by the computing system, a transmission of a fourth data piece to the second electronic device, when the second electronic device is engaged in the subsequent web browser session on the initial web browser or the subsequent web browser, for storage in the second electronic device memory, wherein the fourth data piece is associated with a fourth domain that is linked to the initial web browser or the subsequent web browser, and wherein the fourth data piece contains the second electronic device identification; and retrieving, by the computing system, the fourth data piece from the second electronic device memory when the computing system is not able to retrieve the third data piece from the second electronic device memory, wherein the fourth data piece retrieved from the second electronic device contains the second electronic device identification and one or more items of anonymous personal identification information provided by the second electronic device during the subsequent web browser session.

17. The computer-implemented method of claim 16, further comprising storing, by the computing system, the fourth data piece in a second user profile in the server.

18. The computer-implemented method of claim 16, further comprising:

directing, by the computing system, a transmission of the plurality of data pieces to the first electronic device, when the electronic device is engaged in the initial web browser session on the initial web browser, for storage in the electronic device memory, wherein each of the plurality of data pieces is associated with a different domain that is linked into a chain of domains that includes the second domain, wherein each of the plurality of data pieces is retrievable by the computing system from the electronic device memory, and wherein each of the plurality of data pieces contains the first electronic device identification;

retrieving, by the computing system, the plurality of data pieces from the first electronic device memory when the computing system is not able to retrieve the first data piece from the first electronic device memory, wherein each of the plurality of data pieces retrieved from the first electronic device memory contains the first electronic device identification and the one or more items of anonymous personal identification information provided by the first electronic device during the initial web browser session; and linking, by the computing system, each of the different domains into the chain of domains that includes the second domain based on determining that each of the different domains is able to store a data piece on the first electronic device memory that is retrievable by the computing system.

* * * * *